(12) United States Patent
Ashizawa et al.

(10) Patent No.: US 8,082,045 B1
(45) Date of Patent: Dec. 20, 2011

(54) SUBSTRATE PROCESSING RECIPE MANAGER

(75) Inventors: Yoshiki Ashizawa, Pleasanton, CA (US);
Heng-Cheng Pal, San Jose, CA (US);
Patrick Ngatchou, Santa Clara, CA (US); Kurt Weiner, San Jose, CA (US);
John Schmidt, Oakland, CA (US)

(73) Assignee: Intermolecular, Inc., San Jose, CA (US)

( * ) Notice: Subject to any disclaimer, the term of this patent is extended or adjusted under 35 U.S.C. 154(b) by 1208 days.

(21) Appl. No.: 11/771,836

(22) Filed: Jun. 29, 2007

(51) Int. Cl.
*G05B 11/01* (2006.01)
*G05B 15/00* (2006.01)
*G06F 19/00* (2011.01)
*G06F 3/00* (2006.01)

(52) U.S. Cl. ............ 700/17; 700/83; 700/121; 715/700; 715/866

(58) Field of Classification Search ............... 700/17, 700/83, 121; 715/700, 866
See application file for complete search history.

(56) References Cited

U.S. PATENT DOCUMENTS

| | | | |
|---|---|---|---|
| 5,576,946 A * | 11/1996 | Bender et al. | 700/17 |
| 6,031,990 A | 2/2000 | Sivakumar et al. | |
| 6,629,003 B1 * | 9/2003 | Frizzell et al. | 700/97 |
| 6,665,575 B2 * | 12/2003 | Betawar et al. | 700/121 |
| 6,727,096 B1 | 4/2004 | Wang et al. | |
| 6,775,583 B2 * | 8/2004 | Slodowski et al. | 700/121 |
| 6,983,233 B1 | 1/2006 | Falcioni et al. | |
| 6,984,198 B2 | 1/2006 | Krishnamurthy et al. | |
| 6,996,550 B2 | 2/2006 | Wang et al. | |
| 7,155,361 B2 | 12/2006 | Huang | |
| 7,237,160 B2 | 6/2007 | Lu et al. | |
| 7,292,906 B2 * | 11/2007 | Funk et al. | 700/121 |
| 7,369,913 B2 * | 5/2008 | Heminway et al. | 700/100 |
| 7,793,292 B2 * | 9/2010 | Worek et al. | 718/101 |
| 7,894,918 B2 * | 2/2011 | Kanodia et al. | 700/17 |
| 2009/0164933 A1 * | 6/2009 | Pederson et al. | 715/772 |

OTHER PUBLICATIONS

Erichsen, Thomas et al., Combinatorial microelectrochemistry: Development and evaluation of an electrochemical robotic system, Review of Scientific Instruments 76, 062204 (2005).

* cited by examiner

*Primary Examiner* — Ronald Hartman, Jr.

(57) ABSTRACT

A method to graphically create a recipe for processing a substrate includes displaying graphical images that present processing operations to be performed on the substrate, allowing a user to set properties of the processing operations by manipulating the graphical images, and generating the recipe based on the properties of the processing operations set by the user and synchronizing the plurality of processing operations based on the properties. The graphical images may be time-bars in a Gantt-like chart that allows the user to see the sequence, the timing, and the durations of the processing operations.

26 Claims, 22 Drawing Sheets

SUBSTRATE PROCESSING RECIPE MANAGER

FIELD OF INVENTION

This invention relates to software tools and systems for creating recipes for substrate processing equipment.

DESCRIPTION OF RELATED ART

To improve each successive generation of silicon integrated circuits, semiconductor manufacturing is increasingly relying on new materials and their integration into existing processing sequence. However, typical semiconductor manufacturing equipment is not well suited for material exploration and integration. Issues impacting the use of typical semiconductor manufacturing equipment include difficulty in changing process materials and chemicals rapidly, limited ability to integrate and sequence multiple materials or chemicals in a single reactor or process chamber, high equipment cost, large sample size, and inflexible process or reactor configuration. To complement traditional manufacturing tools, what is needed is processing equipment that facilitates testing of new materials and material processing sequences over a wide range of process conditions, and a software tool that simplifies the creation of recipes for such processing equipment.

SUMMARY

In one embodiment of the invention, a method is provided for graphically creating a recipe for processing a substrate. A processing operation may be applied to the entire substrate or one or more discrete regions on the substrate in a combinatorial process. The method includes displaying graphical images that present processing operations to be performed on the substrate, allowing a user to set properties of the processing operations by manipulating the graphical images, and generating the recipe based on the properties of the processing operations set by the user and synchronizing the plurality of processing operations based on the properties. In one embodiment, the graphical images include time-bars in a Gantt chart. The Gantt chart allows the user to see the sequences, the timing, and the durations of the processing operations so the user can create the recipe in an intuitive manner.

In one embodiment of the invention, the method allows the user to create a rendezvous point between at least two processing operations so they proceed to subsequent processing operations at the same time. This feature allows the user to better tailor the timing and the synchronization of the processing operations.

In one embodiment of the invention, the method allows the user to create a condition so a subsequent processing operation depends on a state of a previous processing operation. This feature allows the user to incorporate logic into the recipe.

In one embodiment of the invention, the method includes displaying a graphical image that presents a chemical composition provided to a processing operation, allowing the user to set the chemical composition by manipulating the graphical image, and generating the recipe based on the chemical composition set by the user. In one embodiment, the graphical image includes a pie chart illustrating the chemicals and their relative proportions. The pie chart helps the user to see the chemicals applied by the processing operation in an intuitive manner.

In one embodiment of the invention, the method saves the recipe in a flexible and extendible format such as XML. This allows the method to create the recipe for any substrate processing system since the XML recipe can be easily converted to the commands structures of different substrate processing systems and subsystems.

DETAILED DESCRIPTION OF THE DRAWINGS

Use of the same reference numbers in different figures indicates similar or identical elements.

DETAILED DESCRIPTION OF THE INVENTION

Figure 1:
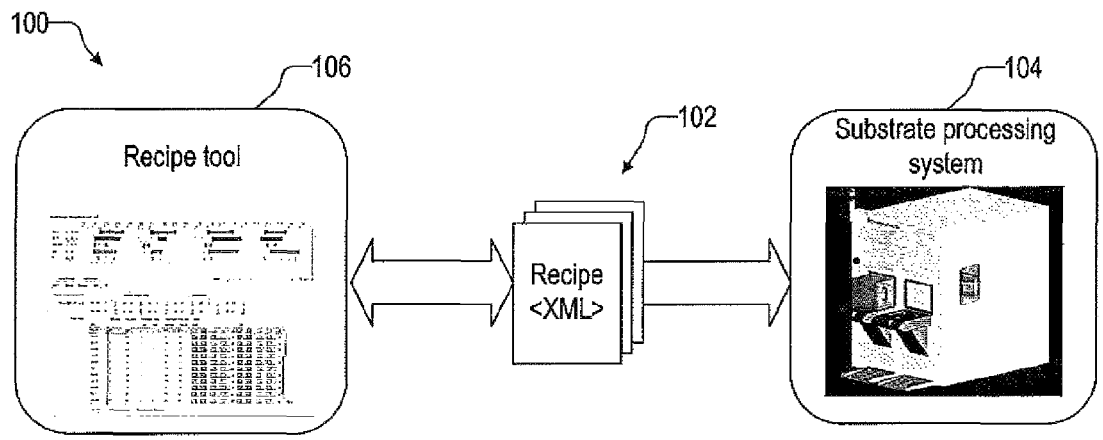
FIG. 1 illustrates a system for creating a recipe for a substrate processing system in one embodiment of the invention.

FIG. 1 illustrates a system 100 for a user to create recipes 102 for a substrate processing system 104 using a recipe tool 106 in one embodiment of the invention. System 104 performs combinatorial processes in which different chemical compositions are applied to multiple isolated sites on a substrate. System 104 includes modular subsystems that prepare the chemical compositions and apply them to the substrate. The type and the number of the modular subsystems depend on the desired processing operations. System 104 is also referred to as a "multi-channel site isolated reactor" or "MCSIR."

Although system 104 is specifically illustrated, it is only an example of the many systems that may be programmed using recipe tool 106. Other systems, such as chemical vapor deposition (CVD) systems, physical vapor deposition (PVD), and atomic layer deposition (ALD) systems, may also be programmed using recipe tool 106 as further described later in reference to FIG. 24.

In one embodiment, recipe tool 106 provides a graphical user interface ("GUI") for creating recipes 102. The GUI presents processing operations of the subsystems with graphical images. The GUI includes a timeline panel with a Gantt chart that displays the processing operations as time-bars. For a given subsystem, the user can arrange the time-bars in a desired sequence. The user can also coordinate the time-bars of multiple subsystems so they act in synchronized sequences. Thus, the Gantt chart helps the user to see the sequences, the timing, and the durations of the processing operations so the user can create a recipe in an intuitive manner. Instead of a Gantt chart, the GUI may use any other chart that is able to synchronize various processing operations and to visually present that synchronization. Alternatives to the Gantt chart include Program Evaluation Review Technique (PERT) charts, Critical Path Method (CPM) charts, and Precedence Diagram Method (PDM) charts.

The timeline panel also allows the user to create dependencies between the processing operations. The user can set a processing operation as the predecessor or the successor of another processing operation from the same subsystem or from a different subsystem. The user can also synchronize the start and the end of processing operations from the same subsystem or from different subsystems.

The GUI includes a properties panel that graphically presents the chemical composition provided to a processing operation. This helps the user to see the chemicals used in the processing operation. The properties panel further allows the user to set a logical condition that must be met before a processing operation proceeds to a subsequent processing operation.

In one embodiment, recipe tool 106 is a rich internet application that runs on a web browser. This allows recipe tool 106 to be located on any computer with a web browser regardless of the operating system so the user can generate recipes 102 offline from system 104. The web browser downloads recipe tool 106, and recipe tool 106 communicates with backend software components on a server computer to generate, validate, and save recipes 102.

In one embodiment, recipes 102 are saved in a flexible and extendible format such as XML. This allows recipes 102 to be easily converted to the command structures of different systems and subsystems. XML recipes 102 can be validated syntactically and dynamically through XML schemas. Syntactic validation ensures the structures and the attributes of XML recipes 102 conform to the format prescribed for system 104. Dynamic validation ensures XML recipes 102 are compatible with the hardware of system 104.

Before going into the details of the GUI in recipe tool 106, an overview of system 104 is provided in reference to FIGS. 2 to 5. Specifically, major subsystems and subsystem components are described along with their operations and constraints. The overview of system 104 is given to provide an example of systems that may be programmed using system 100. For example, recipe 102 may be generated and used to control any time-based processing operation that includes various processes.

Substrate Processing System

Figure 2:
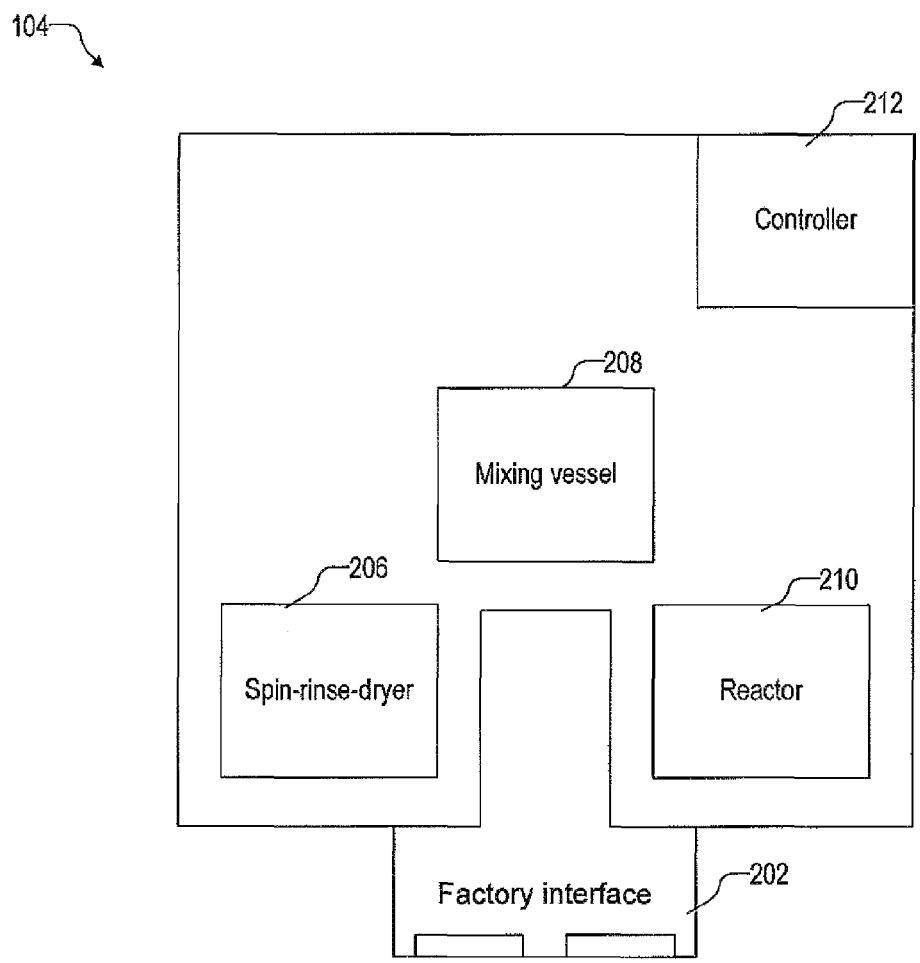
FIG. 2 illustrates a substrate processing system of FIG. 1 in one embodiment of the invention.

FIG. 2 illustrates substrate processing system 104 in one embodiment of the invention. Substrates (e.g., wafers and coupons) enter and leave system 104 through a factory interface subsystem 202. Factory interface subsystem 202 includes a robot, input and output ports with multiple slots, and an aligner. The operations performed by factory interface subsystem 202 include transferring a substrate from one subsystem to another, and holding the substrate between the subsystems.

Other typical subsystems include a spin-rinse-dryer (SRD) subsystem 206, a mixing vessel subsystem 208, and a reactor subsystem 210. SRD subsystem 206 cleans, rinses, and dries the substrates before and after processing. Mixing vessel subsystem 208 uses fluid multiplexers ("muxes") and mixing vessels to prepare a library of chemicals for reactor subsystem 210. Reactor subsystem 210 uses fluid muxes and flow cells to apply different chemical compositions to multiple isolated sites on a substrate. A controller 212 operates factory interface subsystem 202, SRD subsystem 206, mixing vessel subsystem 208, and reactor subsystem 210 in accordance to recipes 102.

Figure 3:
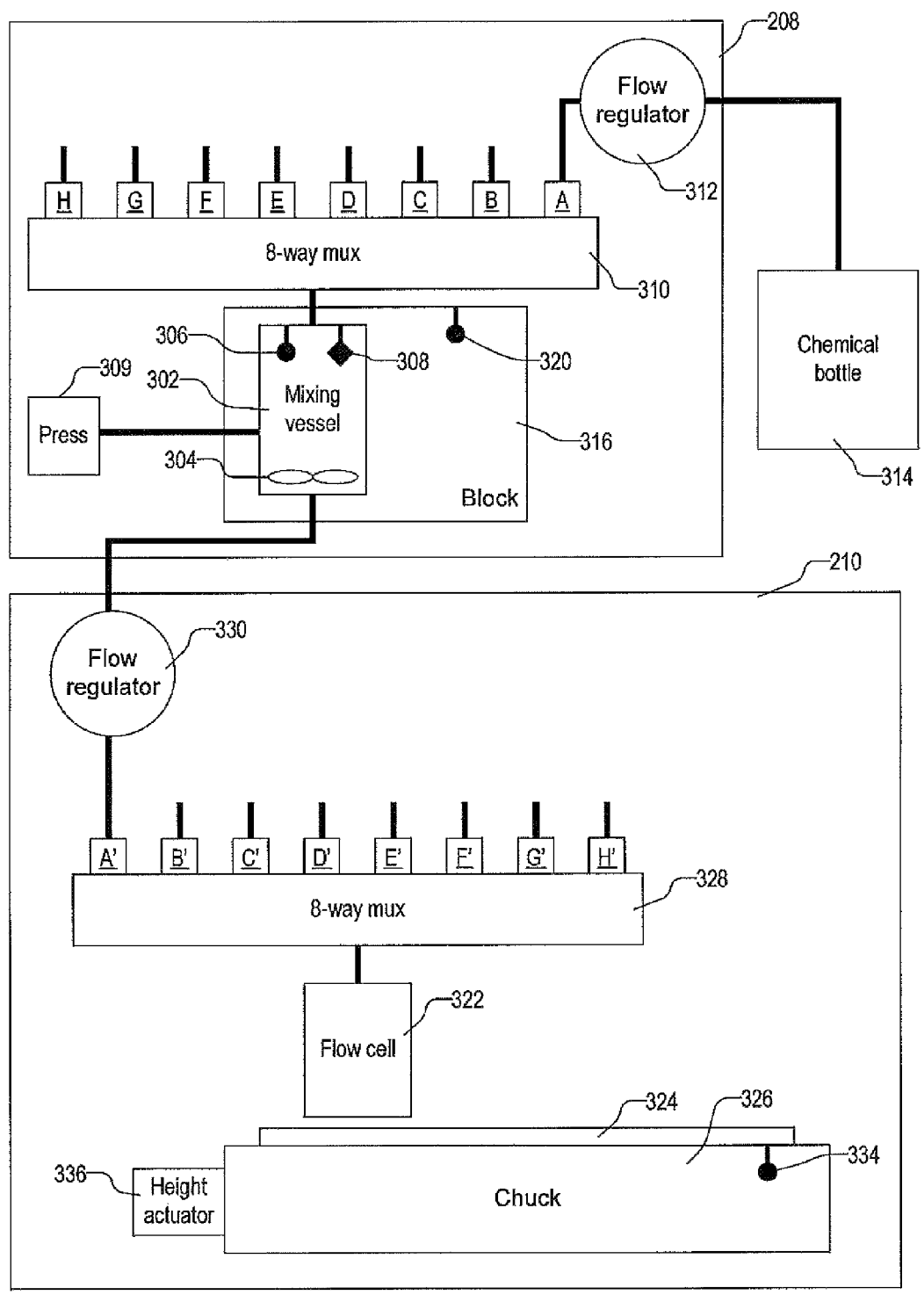
FIG. 3 illustrates a mixing vessel subsystem and a reactor subsystem in the substrate processing system of FIG. 2 in one embodiment of the invention.

FIG. 3 illustrates mixing vessel subsystem 208 and reactor subsystem 210 in one embodiment of the invention. Mixing vessel subsystem 208 typically has twenty-eight mixing vessels 302. For clarity, only one mixing vessel 302 is shown. Mixing vessels 302 are grouped into splits where the mixing vessels in a split share the same properties. Each mixing vessel 302 has a stirrer 304, a temperature sensor 306, a pH sensor 308, and a pressure source 309. Each mixing vessel 302 has its input connected to the output of a fluid mux 310.

Fluid mux 310 typically has eight inputs and one output. For clarity, only one 8-way mux 310 is shown. Each 8-way mux 310 has input valves A to H connected by eight pressure-driven flow regulators 312 to chemical bottles 314 or another mixing vessel (not shown). For clarity, only one flow regulator 312 and one chemical bottle 314 are shown. The corresponding inputs of all of the 8-way muxes 310 are typically connected to the same chemical bottles or mixing vessels.

Mixing vessels 302 are encased in a temperature-controlled block 316. Block 316 includes a heating and cooling device that controls the temperature of mixing vessels 302, and a temperature sensor 320 that senses the temperature of block 316.

Reactor subsystem 210 typically has twenty-eight flow cells 322 that apply chemical compositions to multiple isolated sites on a substrate 324 held by a chuck 326. For clarity, only one flow cell 322 is shown. Flow cells 322 are grouped into splits where the flow cells in a split share the same properties. Each flow cell 322 has two process channels (described later in reference to FIG. 4). Each process channel is connected to the output of a fluid mux 328 or a chemical bottle (not shown).

Fluid mux 328 typically has eight inputs and one output. For clarity, only one 8-way mux 328 is shown. Each 8-way mux 328 has input valves A' to H' connected by eight pressure-driven flow regulators 330 to mixing vessels 302 or chemical bottles (not shown). For clarity, only one flow regulator 330 and one mixing vessel 302 are shown.

Chuck 326 includes a heating and cooling device that controls the temperature of substrate 324, and a temperature sensor 334 that senses the temperature of chuck 326. A height actuator 336 raises and lowers chuck 326 relative to flow cells 322 to change the reactor volume and the flow pattern of the chemical compositions.

Figure 4:
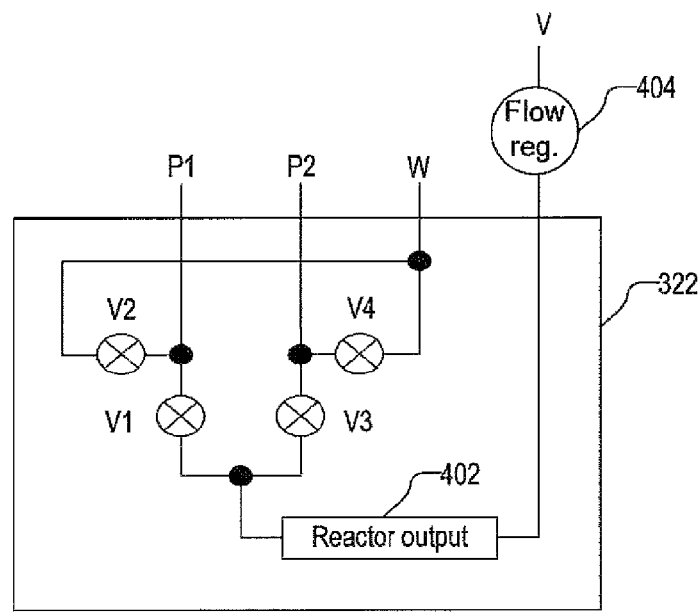
FIG. 4 illustrates a flow cell in the reactor subsystem of FIG. 3 in one embodiment of the invention.

FIG. 4 illustrates a dual-channel flow cell 322 in one embodiment of the invention. Flow cell 322 includes a process channel P1 connected by valve V1 to a reactor output 402, and by valve V2 to a waste line W. Flow cell 322 also includes a process channel P2 connected by valve V3 to reactor output 402, and by valve V4 to waste line W. By providing two process channels, one process channel can be purged while the other provides process chemicals to reactor output 402. For example, process channel P1 can be purged by closing valve V1 and opening valve V2 while process channel P2 provides the process chemicals by opening valve V3 and closing valve V4. Reactor output 402 is connected by a flow regulator 404 to a vacuum line V that exhausts the process chemicals and otherwise controls the flow rate through flow cell 322.

Figure 5:
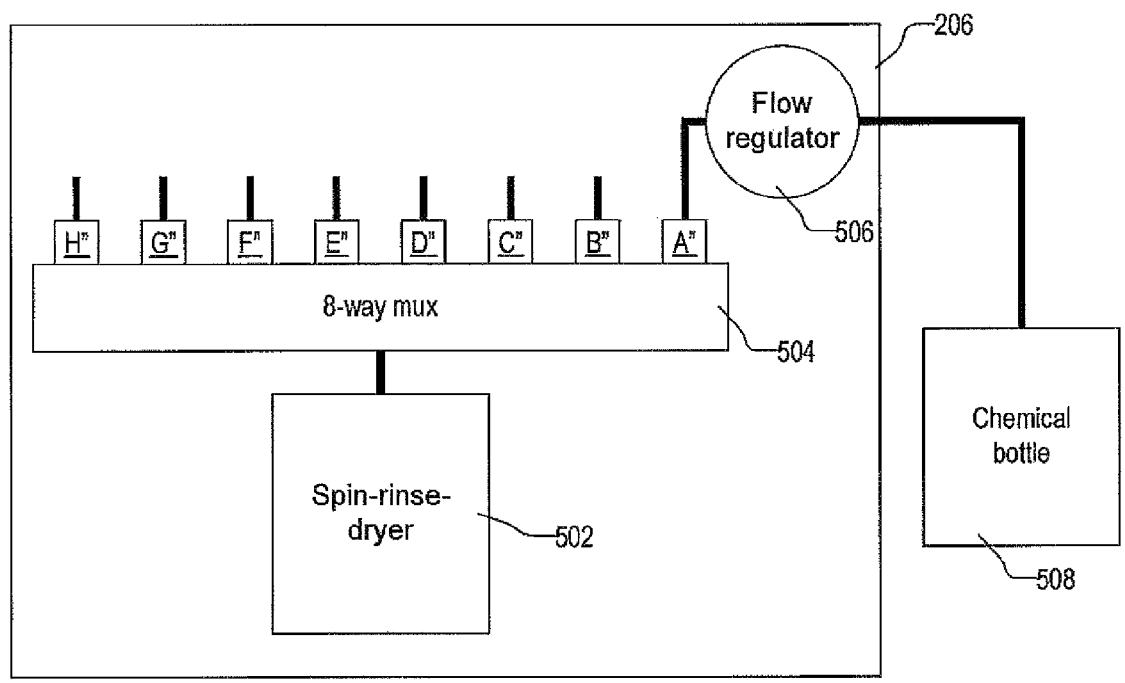
FIG. 5 illustrates a spin-rinse-dryer subsystem in the substrate processing system of FIG. 2 in one embodiment of the invention.

FIG. 5 illustrates SRD subsystem 206 in one embodiment of the invention. SRD subsystem 206 has a spin-rinse-dryer 502 with its input connected to the output of a fluid mux 504.

Fluid mux 504 typically has eight inputs and one output. 8-way mux 504 has input valves A" to H" connected by eight pressure-driven flow regulators 506 to chemical bottles 508 or mixing vessels (not shown). For clarity, only one flow regulator 506 and one chemical bottle 508 are shown.

The subsystems described above can perform global operations that affect the entire substrate, and local operations that are specific to a mixing vessel or a flow cell that affect an isolated site on the substrate. These operations include writable operations that can be set by a processing step in a recipe, and readable operations that can be read by a conditional processing step in the recipe. The following tables summarize the operations and the constraints of the subsystems and the subsystem components.

The above description of substrate processing system 104 is one possible implementation. It is understood that various alterations may be made to substrate processing system 104 and that the above description is given as an example of systems that may be controlled by recipe 102. For example, any number of flow cells 322 (e.g., more or fewer than twenty-eight) may be used with substrate processing system 104. Additional details of substrate processing system 104 can be found in commonly assigned U.S. patent application Ser. No. 11/647,881, entitled "Advanced Mixing System for Integrated Tool Having Site-Isolated Reactors," filed on Dec. 29, 2006, which is incorporated by reference in its entirety.

Software Components

Figure 6:
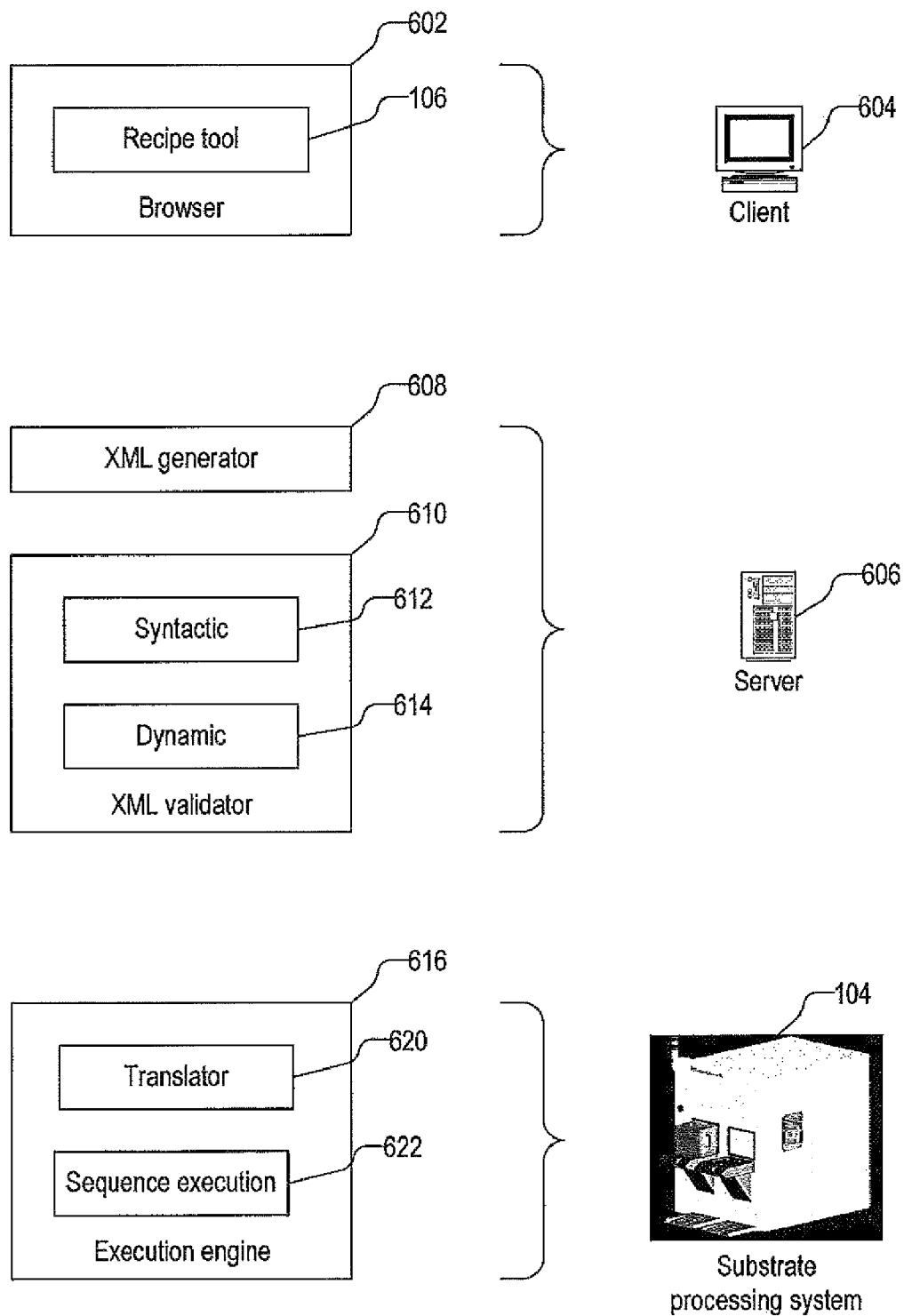
FIG. 6 illustrates software components in the system of FIG. 1 in one embodiment of the invention.

FIG. 6 illustrates the software components of system 100 in one embodiment of the invention. The software components include recipe tool 106 that provides the GUI for creating recipe 102. Recipe tool 106 is a rich internet application that runs in a web browser 602 on a client computer 604. Alternatively, recipe tool 106 may be any application that runs locally or remotely. For example, the recipe tool 106 may also be part of a stand-alone application operated remotely (e.g., through a local area network (LAN) or wide area network (WAN) such as the Internet). In this embodiment, recipe tool 106 is downloaded each time a request is made to its URL. Recipe tool 106 may be created in any suitable programming language, such as Adobe Flex and ColdFusion Markup Language.

Recipe tool 106 communicates with backend software components on a server computer 606. Backend software components include an XML generator 608 and an XML validator 610. Recipe tool 106 provides recipe parameters set by the user to XML generator 608. In response, XML generator 608 creates a recipe 102 in the XML format. XML generator 608 can also parse a recipe 102 and provide the recipe parameters to recipe tool 106 so the user can edit the recipe. Recipe generator 608 may be created in any suitable programming language, such as ColdFusion Markup Language and LabVIEW. As described above, XML is an example of a language in which recipe 102 may be generated. Any other language, such as a scripting language or programming language may be used to generate and execute recipe 102.

Validator 610 includes a syntactic validator 612 and a dynamic validator 614. Syntactic validator 612 checks recipe 102 against the XML syntax and an XML schema for the recipe format. This ensures there are no invalid or missing elements, attributes, and values in recipe 102. Dynamic validator 614 checks recipe 102 against an XML schema for the hardware configuration of system 104. This ensures the subsystems and the subsystem components described in recipe 102 match the actual subsystems and the subsystem components in system 104. Validator 610 may be created in any suitable programming language, such as LabVIEW.

Recipe 102 is executed by an execution engine 616 on controller 212 (FIG. 2) of system 104. Execution engine 616 includes a translator 620 and a sequence execution engine 622. Translator 620 converts recipe 102 into to the native commands of the subsystems. Sequence execution engine 622 operates the subsystems by sending the commands in the sequences and in accordance to the conditions specified in recipe 102. Execution engine 616 may be created in any suitable programming language, such as LabVIEW.

Figure 7:
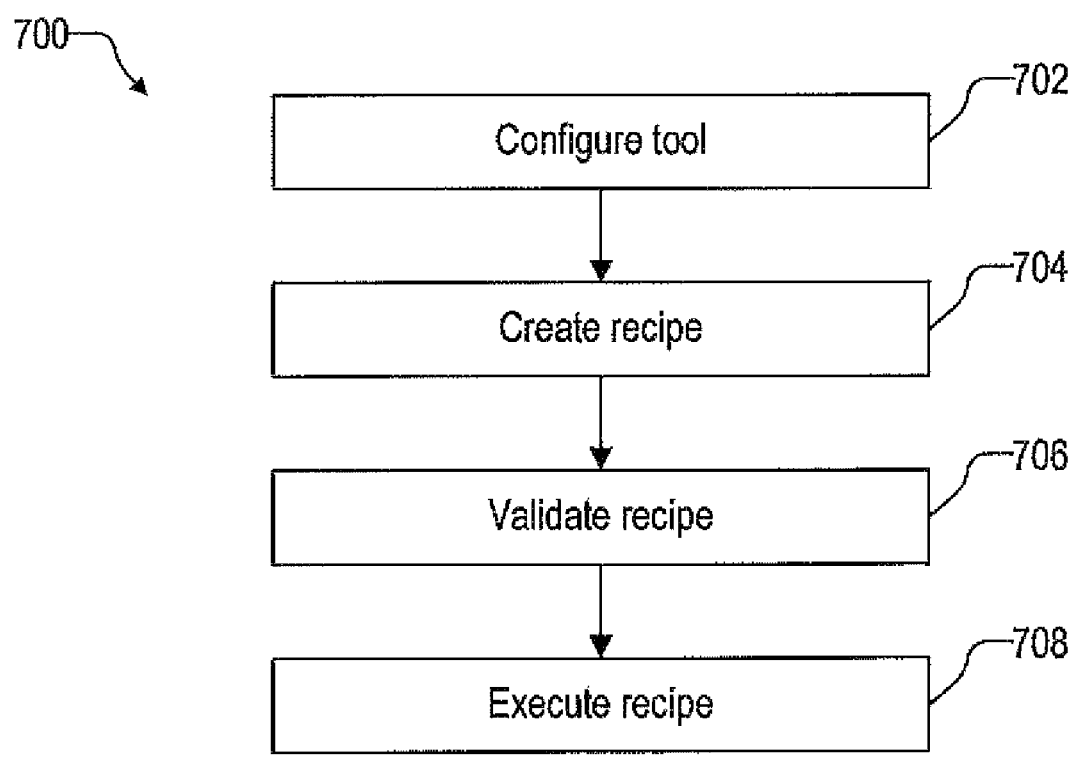
FIG. 7 illustrates a workflow for creating and executing a recipe in the system of FIG. 1 in one embodiment of the invention.

FIG. 7 is a flowchart 700 of the overall workflow for the user to create and execute recipe 102 using system 100 in one embodiment of the invention.

In step 702, the user provides the hardware and the chemical configurations of system 104 to recipe tool 106. This may be done because system 104 can be configured in many ways depending on its application. An exemplary user interface for inputting the hardware and the chemical configurations is described later in reference to FIGS. 8 to 10.

In step 704, the user creates recipe 102 using recipe tool 106. As introduced above, recipe tool 106 graphically presents processing operations and chemical compositions so the user can create recipe 102 in an intuitive manner. Furthermore, recipe tool 106 allows the user to set dependencies, synchronizations, and conditions for the processing operations in recipe 102. An exemplary user interface for creating recipe 102 is described later in reference to FIGS. 8 and 11 to 21.

In step 706, the user validates recipe 102 with validator 610 (FIG. 6). In one embodiment, recipe 102 is validated each time the user loads the recipe, the user saves the recipe, and prior to execution engine 616 (FIG. 6) executing the recipe.

In step 708, the user loads recipe 102 into system 104 and then executes recipe 102 using execution engine 616 (FIG. 6).

Hardware and Chemical Configurations

FIGS. 8 to 22 are examples of generating a recipe 102 to operate substrate processing system 104. As described later in reference to FIG. 24, recipe tool 106 may be used to generate recipes for other processing systems.

Figure 8:
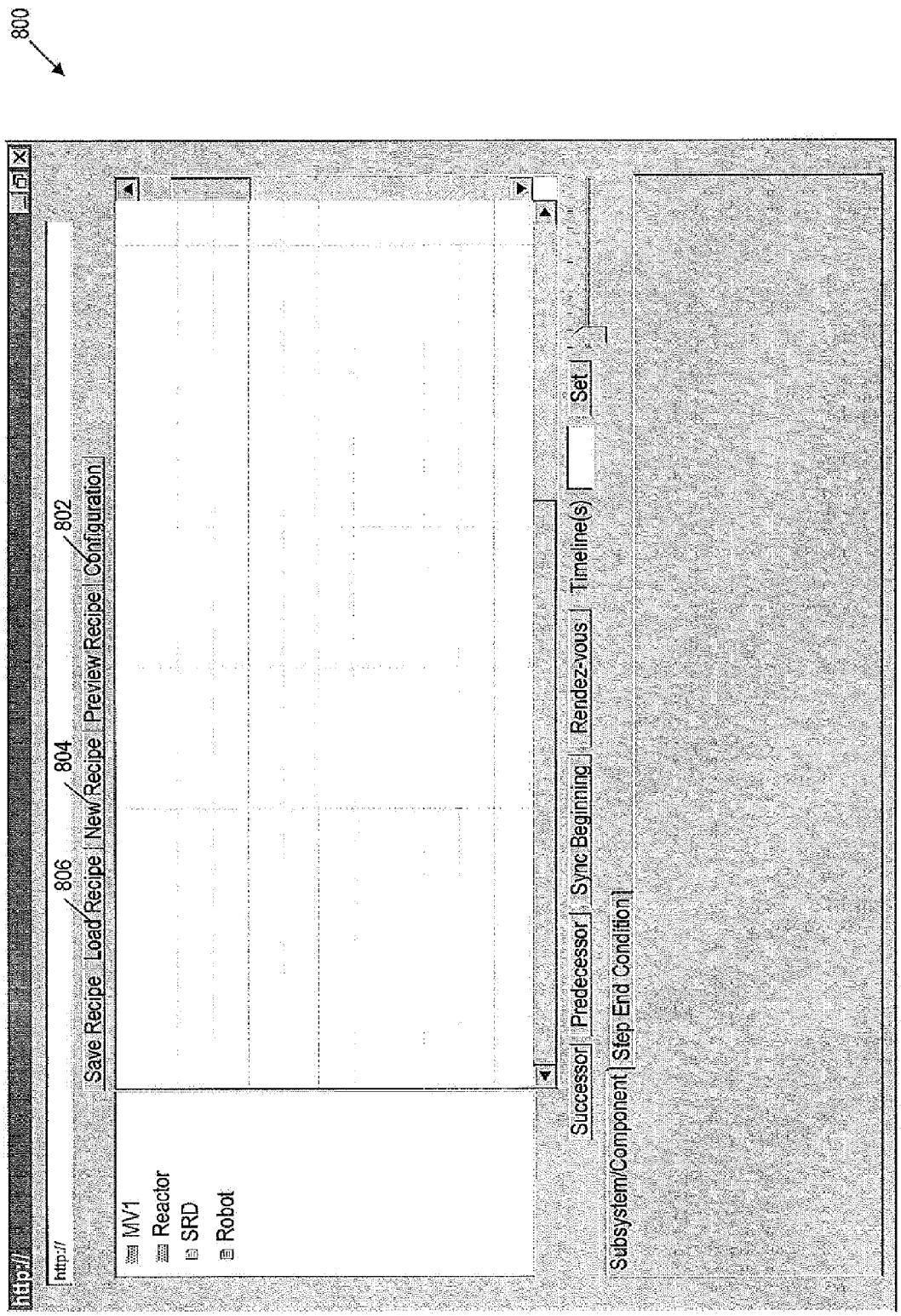
FIGS. 8 to 10 illustrate a user interface for setting hardware and chemical configurations in a recipe tool of FIG. 1 in one embodiment of the invention.

FIG. 8 illustrates a screen 800 of recipe tool 106 in one embodiment of the invention. Screen 800 is the first screen the user sees when she access recipe tool 106 in her web browser. Prior to creating recipe 102 for system 104, the user must first provide the hardware and the chemical configurations of system 104 to recipe tool 106. To do this, the user selects a configuration button 802. In response, recipe tool 106 displays a configuration screen 900 (FIG. 9).

Figure 9:
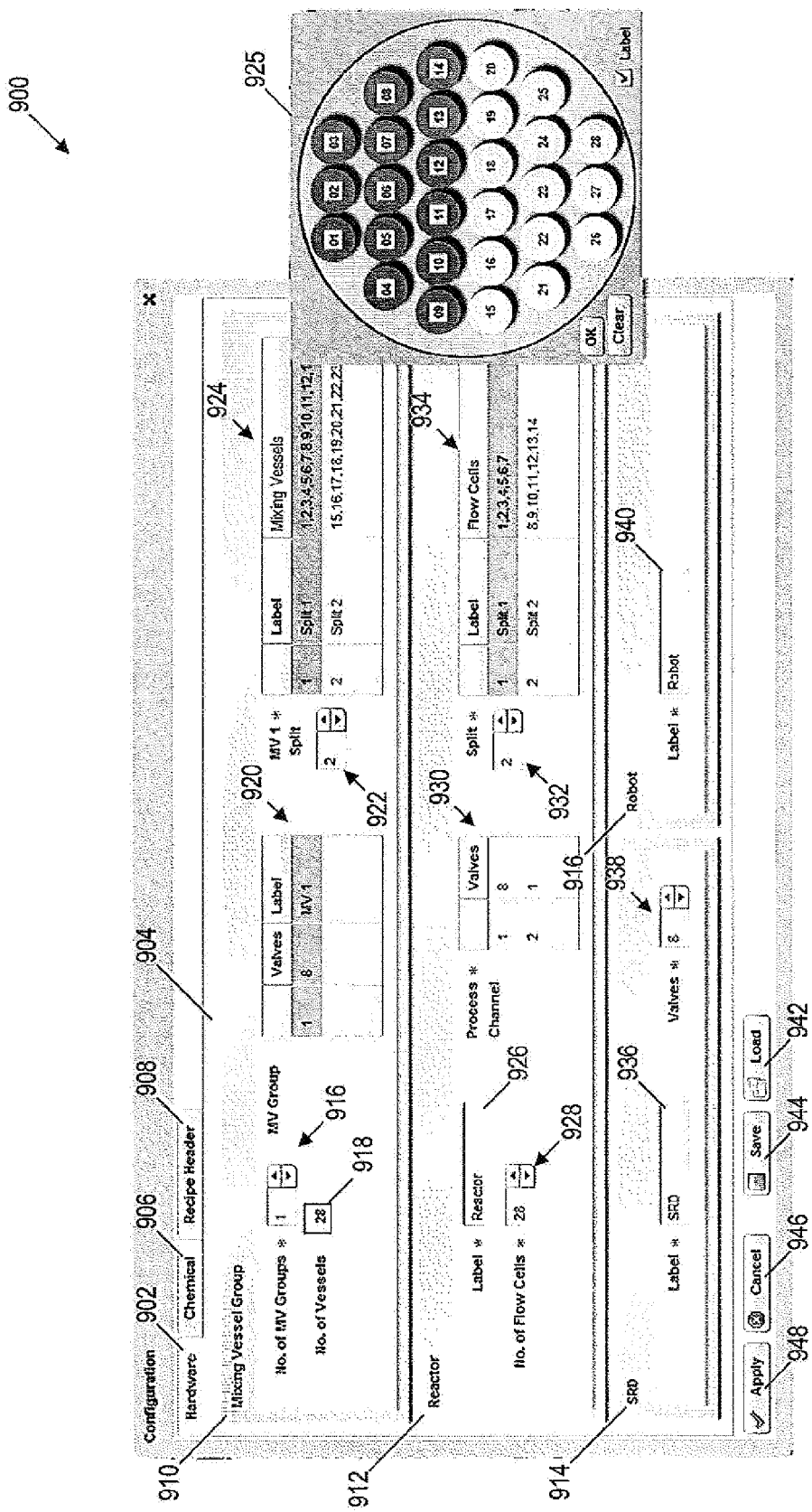

FIG. 9 illustrates configuration screen 900 in one embodiment of the invention. Configuration screen 900 includes tabs for accessing three pages. The user selects a hardware tab 902 to access a hardware configuration page 904 shown in FIG. 9. The user selects a chemical tab 906 to access a chemical configuration page 1000 shown in FIG. 10. The user selects a header tab 908 to access a recipe header configuration page where the user sets a recipe header with an author, a version number, and a brief description.

Staying with FIG. 9, in one embodiment, hardware configuration page 904 includes (1) a mixing vessel panel 910 for inputting the hardware configuration of the mixing vessel subsystems, (2) a reactor panel 912 for inputting the hardware configuration of the reactor subsystem, (3) an SRD panel 914 for inputting the hardware configuration of the SRD subsystem, and (4) a factory interface panel 916 for inputting the hardware configuration of the factory interface subsystem.

In mixing vessel panel 910, the user provides (1) the number of mixing vessel subsystems via a spinner 916, (2) the number of mixing vessels in each subsystem in a text box 918, (3) the number of input valves of the fluid mux and the labels for the mixing vessel subsystems in a table 920, (4) the number of splits in the mixing vessel subsystems via spinners 922 (only one is shown), and (5) the labels for the splits and the mixing vessels assigned to the splits in tables 924 (only one is shown). When a split is selected in table 924, a graphical representation 925 of the splits appears to visually show the organization of the mixing vessels.

In reactor panel 912, the user provides (1) the label for the reactor subsystem in a text box 926, (2) the number of flow cells in the reactor subsystem via a spinner 928, (3) the input valves of the fluid mux connected to the process channels of the flow cells in a table 930, (4) the number of splits in the reactor subsystem via a spinner 932, and (5) the labels for the splits and the flow cells assigned to the splits in a table 934. Similar to mixing vessel panel 910, a graphical representation of the splits appears when a split is selected in table 934.

In SRD panel 914, the user provides the label for the SRD subsystem in a text box 936, and the number of input valves in the fluid mux via a spinner 938.

In factory interface panel 916, the user provides the label for the factory interface subsystem in a text box 940.

At the bottom of hardware configuration panel 904, the user can select a load button 942 to load a saved hardware configuration, a save button 944 to save the current hardware configuration, a cancel button 946 to return all the hardware properties to their default values, and an apply button 948 to apply the property values to the current recipe.

After setting the hardware configuration of system 104, the user selects chemical tab 906 to access chemical configuration page 1000 (FIG. 10) to set the chemical configuration of system 104.

Figure 10:
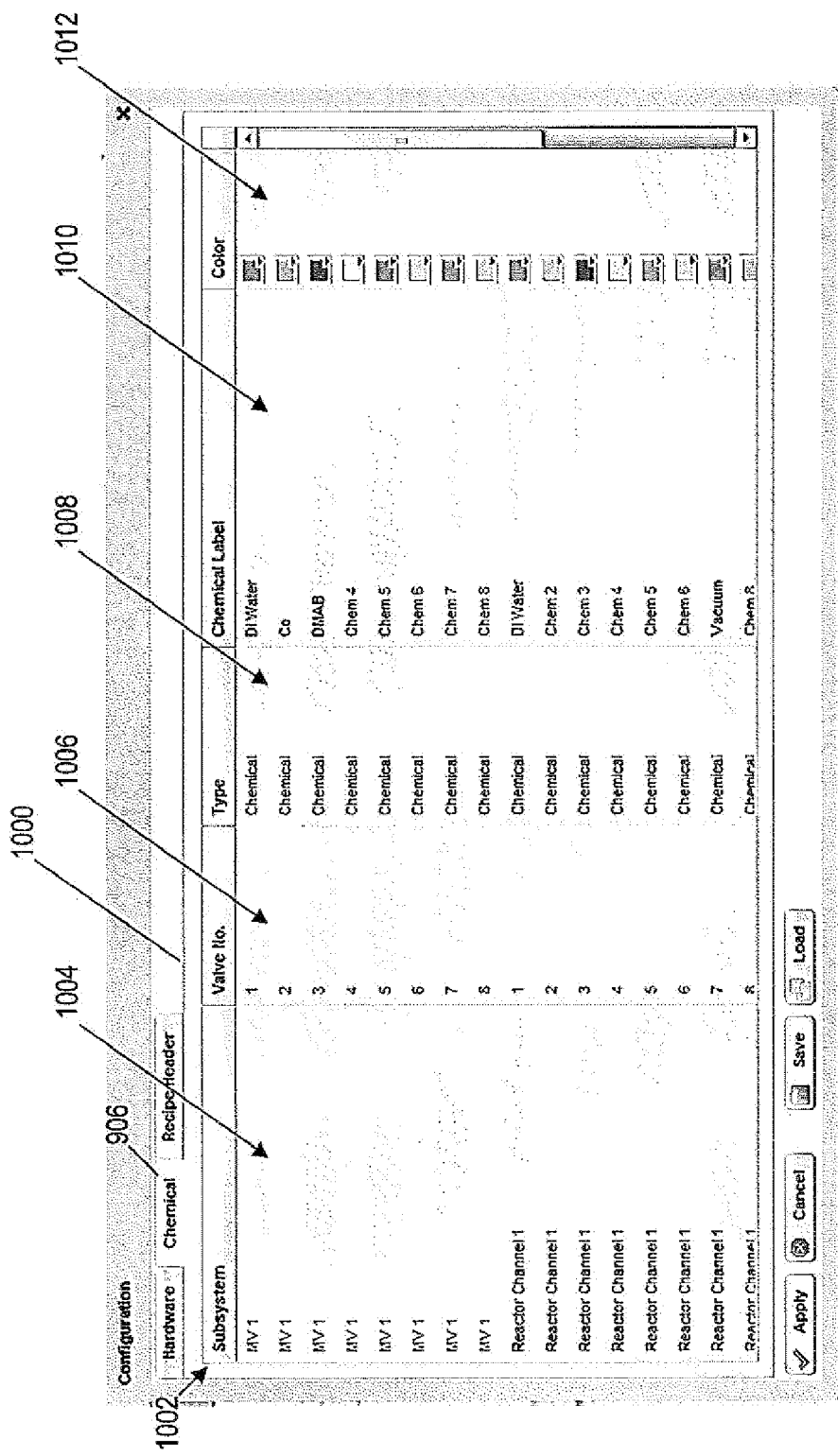

FIG. 10 illustrates chemical configuration page 1000 in one embodiment of the invention. Chemical configuration page 1000 includes a table 1002 with (1) a column 1004 listing the subsystems that receives chemicals, (2) a column 1006 listing the input valves of the fluid muxes of the subsystems, (3) a column 1008 where the user inputs the source types of the input valves (e.g., a chemical bottle or a mixing vessel), (4) a column 1010 where the user inputs chemical labels, and (5) a column 1012 where the user sets the colors or patterns that represent the chemicals. The subsystems listed in column 1004 and the input valves listed in column 1006 are generated from the hardware configuration provided by the user in hardware configuration page 904 (FIG. 9). The colors or patterns representing the chemicals are used later in the graphical presentations of the processing operations in recipe creation so the user can easily identify the chemicals used in the processing operations.

Recipe Creation

After setting the hardware and the chemical configurations of system 104, the user returns to screen 800 to create recipe 102.

Figure 11:
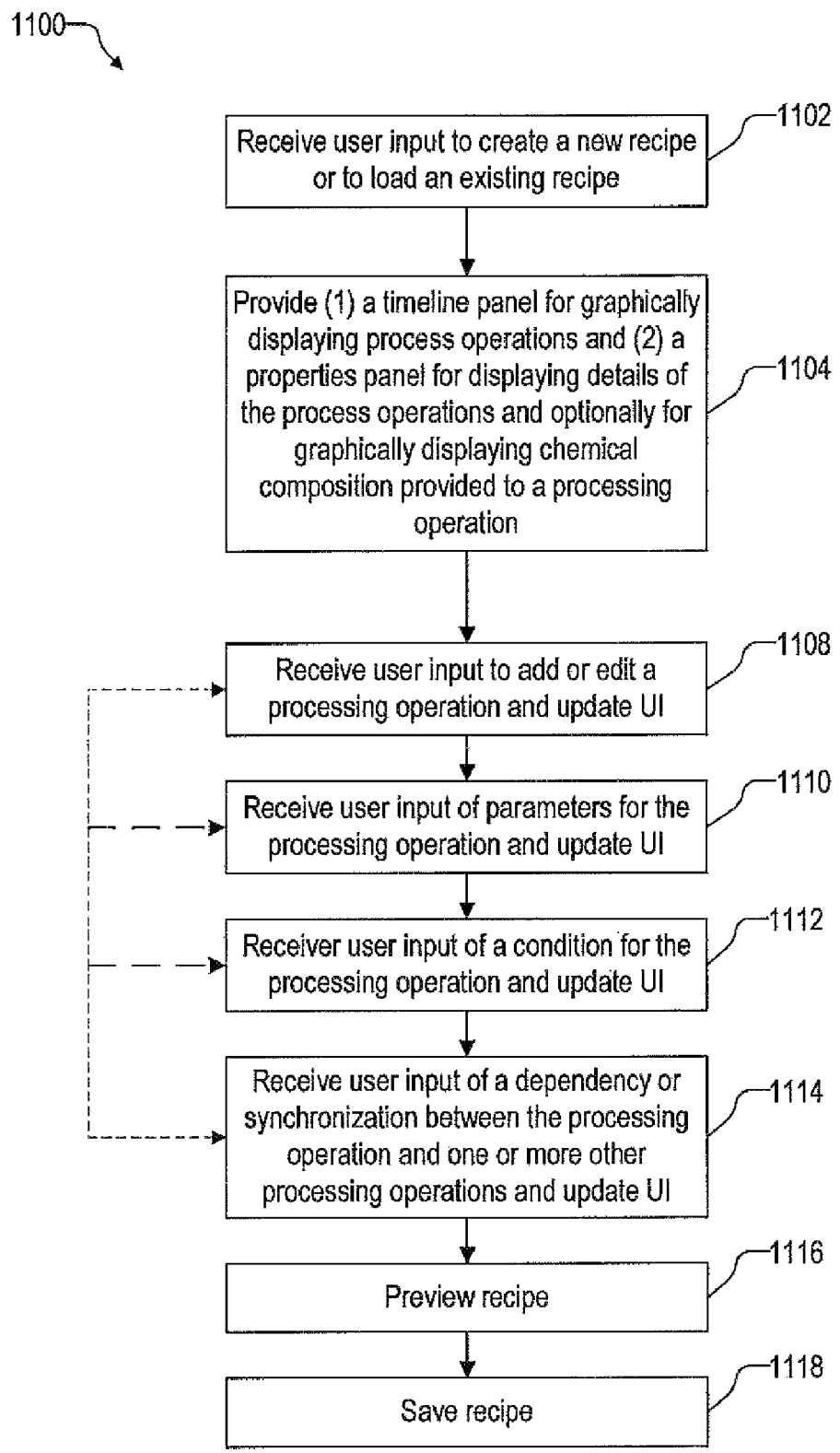
FIG. 11 illustrates a workflow for using the recipe tool of FIG. 1 to create a recipe in one embodiment of the invention.

FIG. 11 illustrates a workflow 1100 for the user to create recipe 102 using recipe tool 106 in one embodiment of the invention. Workflow 1100 is explained hereafter in view of the user interface of recipe tool 106 shown in FIGS. 8, 12, and 15.

In step 1102, recipe tool 106 receives user input to create a new recipe or to load an existing recipe. Referring to FIG. 8, the user selects a "new recipe" button 804 in screen 800 to create a new recipe 102 from scratch. Alternatively, the user selects a "load recipe" button 806 to load an existing recipe 102 for editing. To help explain workflow 1100, FIG. 12 shows screen 800 after an exemplary recipe 102 is loaded into recipe tool 106.

In step 1104 (FIG. 11), recipe tool 106 makes active a timeline panel and a properties panel in screen 800.

Figure 12:
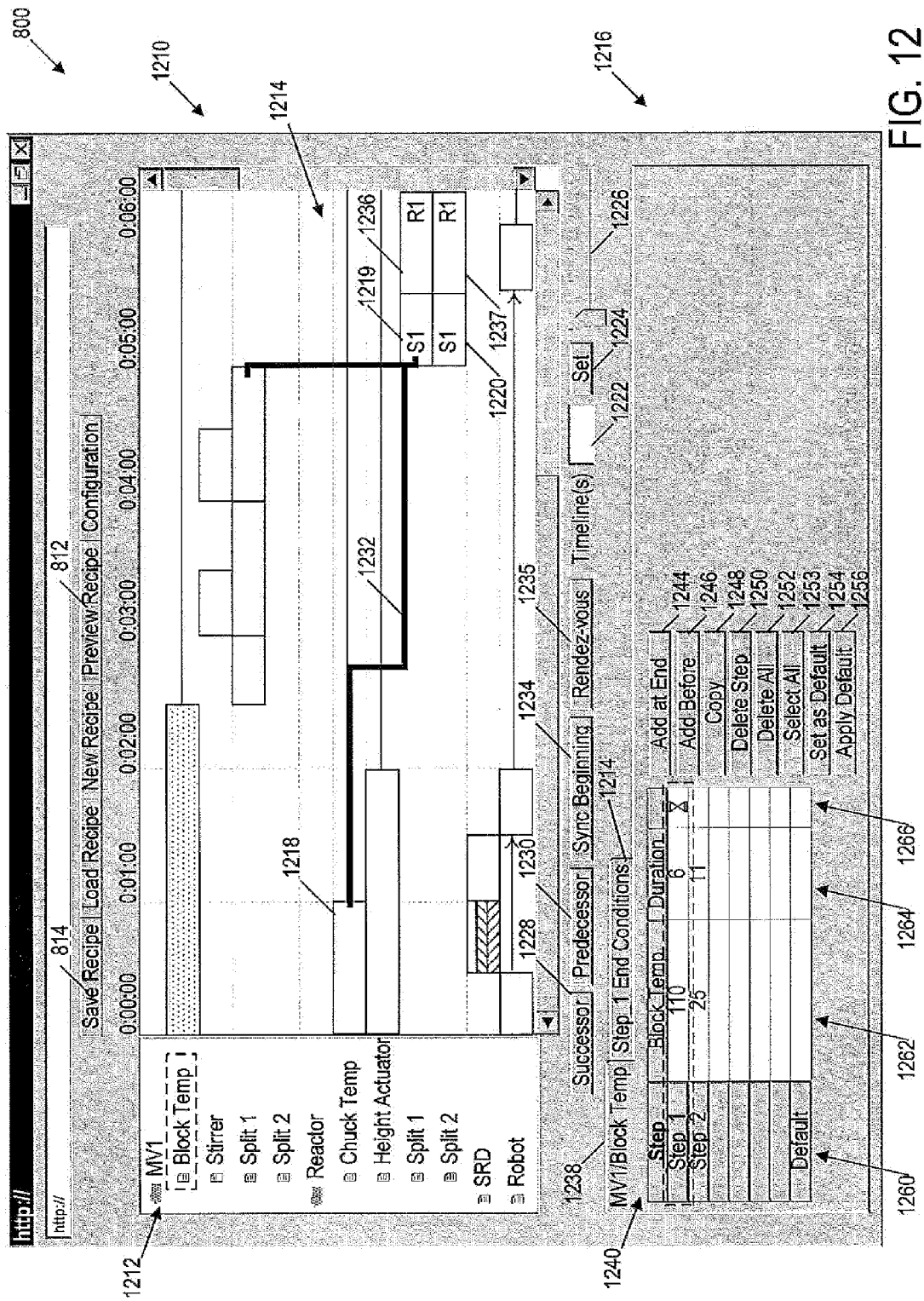
FIGS. 12 to 22 illustrate a user interface for creating the recipe in the recipe tool of FIG. 1 in one embodiment of the invention.

FIG. 12 illustrates a timeline panel 1210 in one embodiment of the invention. Timeline panel 1210 includes an expandable tree 1212 and a Gantt chart 1214. Tree 1212 lists the subsystems and the subsystem components along the vertical axis. The subsystems and the subsystem components are provided by the user in hardware configuration page 904 (FIG. 9). For a mixing vessel subsystem, the subsystem components include the block (i.e., the block temperature), the stirrer, and the splits of the mixing vessels. For a reactor subsystem, the subsystem components include the chuck (i.e., the chuck temperature), the height actuator, and the splits of the flow cells. The SRD and the factory interface subsystems are not divided into subsystem components in tree 1212.

Gantt chart 1214 presents processing operations as time-bars along the horizontal axis representing time. The time-bars are vertically aligned with the corresponding subsystems and subsystem components in tree 1212. The body of each time-bar may display a short summary of its properties. When the cursor is placed over a time-bar for some time, a more detailed summary of its properties may be generated in a popup box.

The user can set the length of timeline panel 1210 in a text box 1222 and then select a set button 1224. The length of the timeline panel 1210 corresponds to, for example, the length of the entire operation performed by substrate processing system 104. The user can change the scale of timeline panel 1210 by adjusting a slider 1226.

FIG. 12 also illustrates a properties panel 1216 in one embodiment of the invention. Properties panel 1216 includes tabs for accessing two pages. The user selects a tab 1238 to access a page 1240 with a table for setting the properties of the processing operations for a highlighted subsystem or subsystem component. A subsystem or a subsystem component becomes highlighted when the user selects the subsystem, the subsystem component, or a processing operation of the subsystem or the subsystem component. The user selects a tab 1242 to access a page 1300 (FIG. 13) for setting end conditions for a processing operation highlighted in Gantt chart 1214 or page 1240.

When the user selects a subsystem, a subsystem component, or a processing operation in timeline panel 1210, page 1240 of properties panel 1216 displays a table that lists the properties of the processing operations for the corresponding subsystem or subsystem component. For example, in FIG. 12, the table in page 1240 lists the properties of the processing operations for the temperature block of the mixing vessel subsystem.

Figure 15:
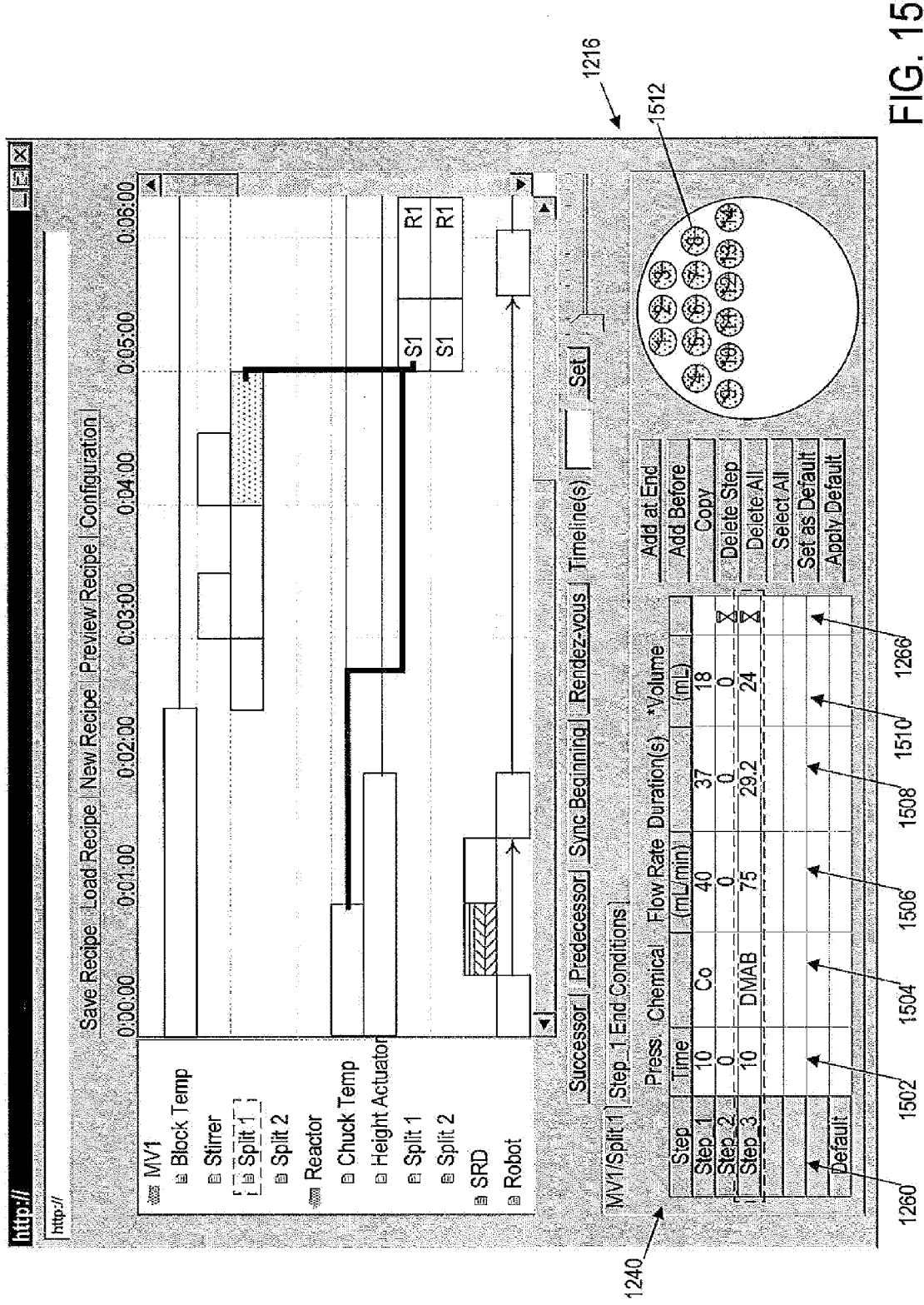

Properties panel 1216 may also display the chemical composition for a processing operation. FIG. 15 illustrates properties panel 1216 that displays a table and pie charts 1512 (only one is labeled) in one embodiment of the invention. Pie charts 1512 illustrate the chemical composition used in the processing operation and the chemical proportions. Note that the chemicals are identified by the colors or patterns assigned by the user in chemical configuration panel 1000 (FIG. 10). Instead of pie charts 1512, properties panel 1216 may display any other chart that is able to visually present the chemical composition and the chemical proportions. Alternatives to the pie charts include bar charts, dot plots, and matrix charts.

In step 1108 (FIG. 11), recipe tool 106 receives user input to add a new processing operation or edit an existing processing operation. Referring to FIG. 12, the user can add a new process operation to the end of the existing process operations by selecting an "add at end" button 1244. The user can add a new process operation before an existing process operation by selecting an "add before" button 1246.

The user can copy an existing process operation by selecting the processing operation and then selecting a copy button 1248. The user can delete an existing processing operation by selecting the processing operation and then selecting a delete button 1250. The user can delete all the existing processing operations by selecting a "delete all" button 1252. The user can select all the existing processing operation by selecting a "select all" button 1253.

In response to the user input, recipe tool 106 updates timeline panel 1210 and properties panel 1216 in real-time.

In step 1110 (FIG. 11), recipe tool 106 receives user input of the properties for the processing operation. Referring to FIG. 12, the user can expand and contract the time-bars in Gantt chart 1214 to set the durations of the processing operations. The user can drag and drop the time-bars to change their sequences. Adjacent time-bars for a subsystem are performed in sequence unless an idle processing operation with only a specified duration is inserted between the time-bars or one of the time-bars depends from or is synchronized with a time-bar from another subsystem. Referring to FIG. 15, the user can select and manipulate the sectors of pie charts 1512 to set the chemicals for a split and to change the their proportions.

Referring back to FIG. 12, the user can also more detailed properties of the processing operations in properties panel 1216. As discussed above, the user can select tab 1238 to access a page 1240 for setting properties for the processing operations. Page 1240 displays a table with a column 1260 listing the processing operation numbers (e.g., step_1, step_2, and so on), and a column 1266 indicating if the processing operations have end conditions. The other columns between columns 1260 and 1266 are specific to each subsystem and subsystem component. The details of these subsystem specific columns are explained later in reference to FIGS. 12 and 14 to 20.

After the user sets the properties of a processing operation, the user can specify the processing operation as a default processing operation by selecting a "set default" button 1254. The default processing operation is displayed as the last row of the table in page 1240. The user can easily duplicate the default processing operation to create a new processing operation. The user can also select one of the processing operations in the table and change its properties to the default properties by selecting an "apply default" button 1256.

In response to the user input, recipe tool 106 updates timeline panel 1210 and properties panel 1216 in real-time.

In step 1112 (FIG. 11), recipe tool 106 receives user input of a condition for the processing operation.

Figure 13:
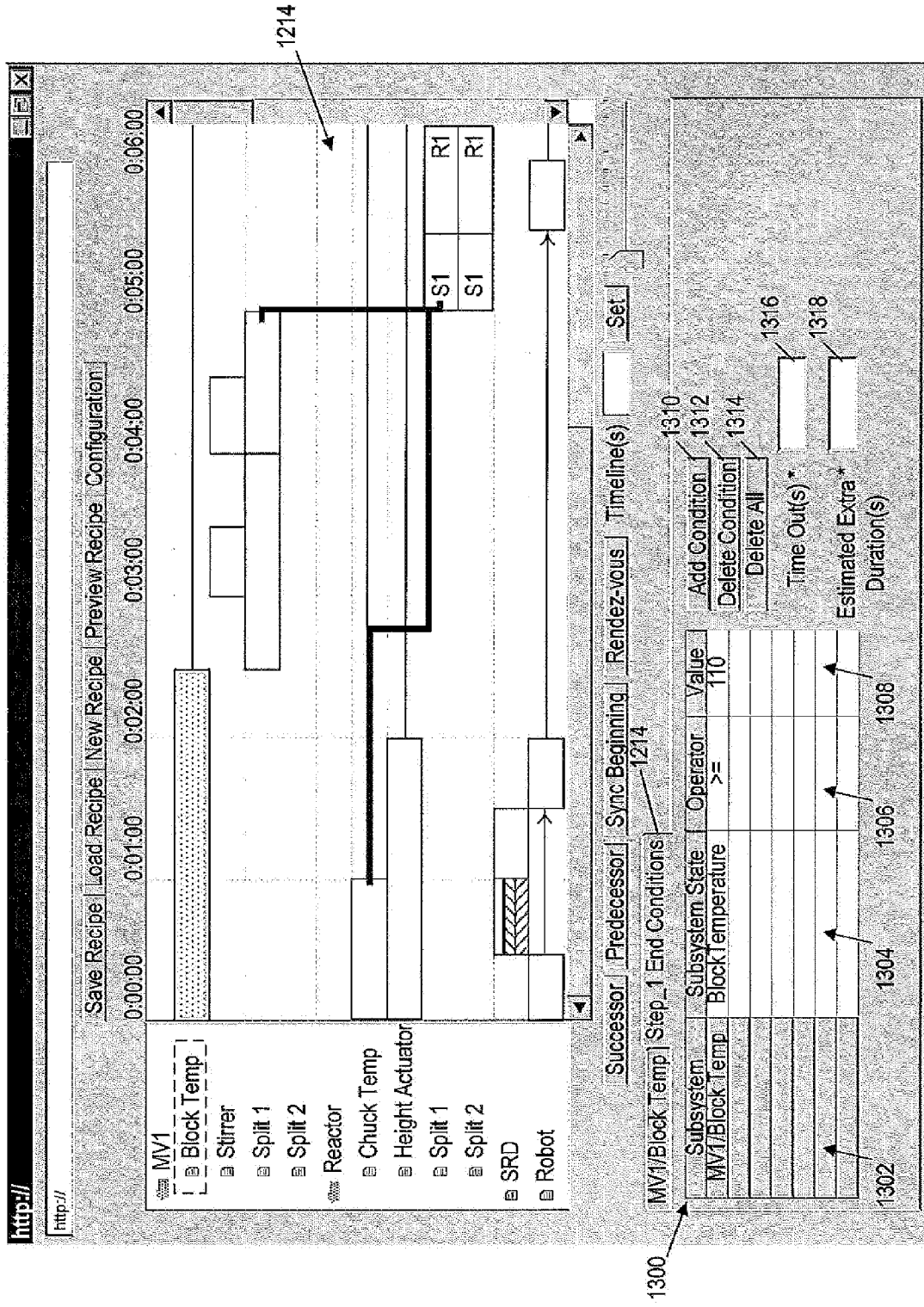

Referring to FIG. 13, the user selects tab 1214 to access page 1300 for setting end conditions for a processing operation highlighted on page 1240 (FIG. 12). An end condition allows a processing operation to proceed to a subsequent processing operation after a state of a subsystem or subsystem component has been reached.

FIG. 13 illustrates page 1300 in one embodiment of the invention. Page 1300 includes a table with (1) a column 1302 listing the subsystem or the subsystem component of the processing operation, (2) a column 1304 for the user to input subsystem states, (3) a column 1306 for the user to input logical operators (e.g., >, >=, =, <=, and <) for the subsystem states, and (4) a column 1308 for the user to input values against which the subsystem states are compared. Each subsystem state is determined by the read operations listed in Tables 1 and 2 that are specific to the subsystems and the subsystem components. In FIG. 13, the user has set an end condition for a processing operation of a split in the mixing vessel subsystem. The end condition allows the processing operation to proceed to a subsequent processing operation after the block temperature is greater than or equal to 110.

To add a new condition, the user selects an "add condition" button 1310. To delete a condition, the user selects the condition and then selects a delete button 1312. To delete all the conditions, the user selects a "delete all" button 1314.

The user can set a time out in a text box 1316. The time out is a time allotted for the subsystem or the subsystem component to reach the set state. If the subsystem or the subsystem component does not reach the set state within the allotted time, the processing operation proceeds to the subsequent operation.

The user can set estimated extra durations in a text box 1318. The estimate extra duration is an estimated duration for a processing operation that does not have a specific duration but ends when a condition is reached. This allows the processing operation to be shown as a time-bar in Gantt chart 1214.

In response to the user input, recipe tool 106 updates timeline panel 1210 and properties panel 1216 in real-time.

In step 1114 (FIG. 11), recipe tool 106 receives user input on a dependency or a synchronization for the processing operation with one or more other processing operations.

For a dependency, the user can set a predecessor or successor for a processing operation that is from the same subsystem or from a different subsystem. When the processing operation has a predecessor, it cannot start until the predecessor has finished. When the processing operation has a successor, the successor cannot start until the processing operation has finished.

Referring to FIG. 12, the user selects a first processing operation in Gantt chart 1214 or page 1240, selects a "successor" button 1228 or a "predecessor" button 1230, and then selects a second processing operation that is to succeed or precede the first processing operation.

In Gantt chart 1214, a predecessor or successor relationship between two time-bars is illustrated as a link that connects the head and the tail of the two time-bars. For example, time-bars 1218 and 1219 are connected by a link 1232. Link 1232 indicates that the processing operation of time-bar 1219 remains idle until the processing operation in time-bar 1218 is completed. Link 1232 is particularly useful in visually presenting all the dependencies between the processing operations.

For synchronization, the user can synchronize the beginning or the end of multiple processing operations so they start or end at the same time before proceeding to subsequent processing operations. The synchronized processing operations can be from the same subsystem or a different subsystem. To synchronize the processing operations, the user selects a first processing operation in Gantt chart 1214 or page 1240, selects a "sync beginning" button 1234 or a "rendezvous" button 1235, and then selects one or more processing operations in Gantt chart 1214 or page 1240 that will begin at the same time as the first processing operation or end at the same time as the first processing operation before proceeding to subsequent processing operations.

In Gantt chart 1214, the time-bars that are synchronized to begin at the same time have the same start label (e.g., "S1") at the heads of the time-bars. For example, time-bars 1219 and 1220 are synchronized to begin at the same time. The time-bars that are synchronized to end at the same time have the same rendezvous label (e.g., "R1") at the tails of the time-bars. For example, time-bars 1236 and 1237 are synchronized to end at the end time.

In response to the user input, recipe tool 106 updates timeline panel 1210 and properties panel 1216 in real-time.

Although steps 1108, 1110, 1112, and 1114 are shown in a particular order, the user can create recipe 102 in any order and also go back to any of these steps to modify recipe 102.

Figure 22:
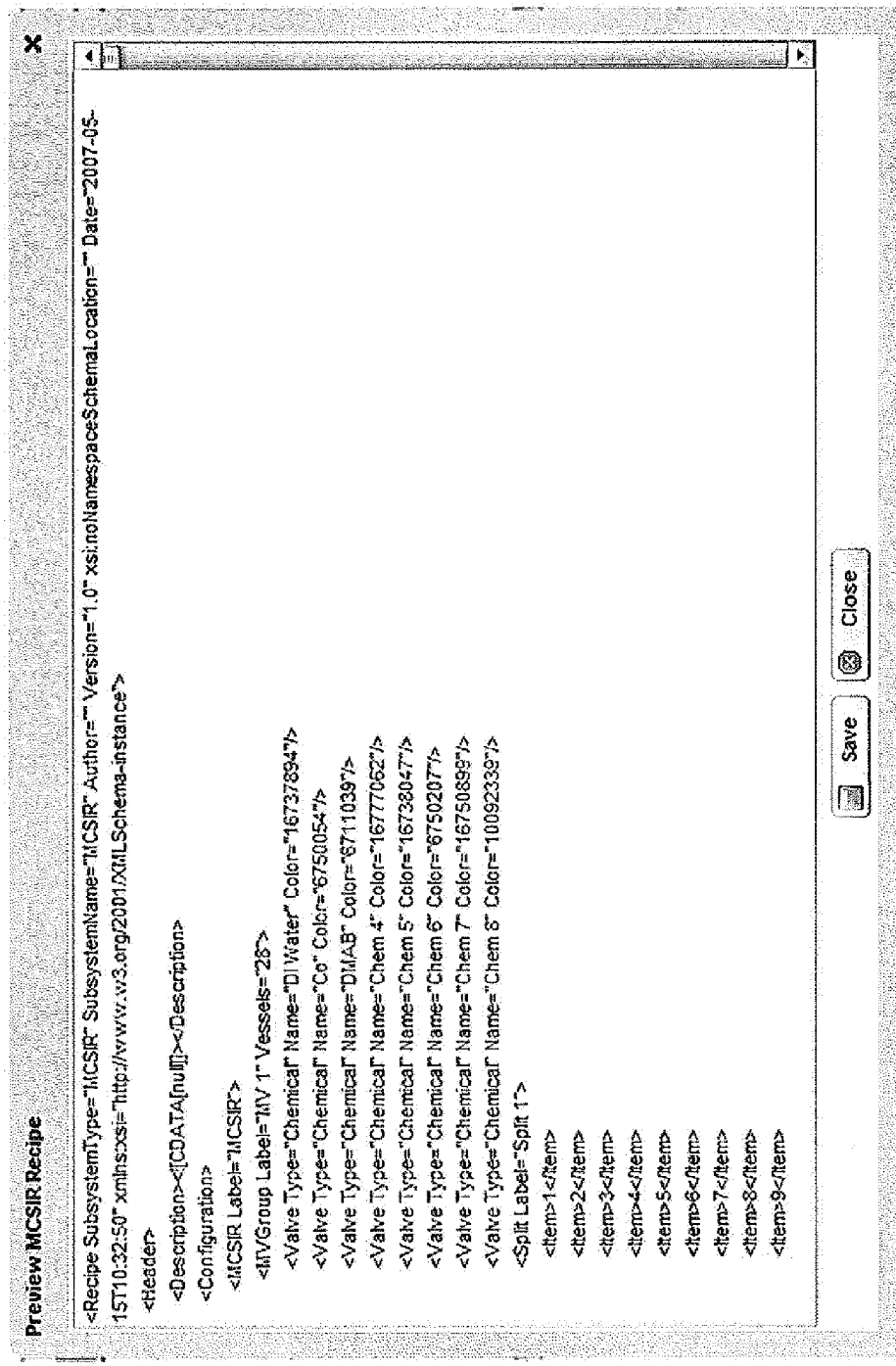

In step 1116 (FIG. 11), recipe tool 106 receives user input to preview recipe 102. Referring to FIG. 12, the user selects a "preview recipe" button 1208 to see the XML code of the current recipe 102. FIG. 22 illustrates a preview 2200 of recipe 102 in one embodiment of the invention.

In step 1118 (FIG. 11), recipe tool 106 receives user input to save recipe 102. Referring to FIG. 12, the user selects a "save recipe" button 814 to save the current recipe 102 on a local computer or to a remote server computer. Note that recipe 102 is validated by validator 610 (FIG. 6) each time it is loaded or saved.

Subsystem Component Properties

As discussed above, properties panel 1216 displays a different table in page 1240 for setting the properties of the processing operations for each subsystems and subsystem component. The tables for the subsystems and the subsystem components are explained hereafter in view of FIGS. 12 and 14 to 20.

FIG. 12 illustrates the table in page 1240 for setting properties of a block in a mixing vessel subsystem in one embodiment of the invention. The user provides block temperatures in a column 1262, and the durations for the block temperatures in a column 1264.

Figure 14:
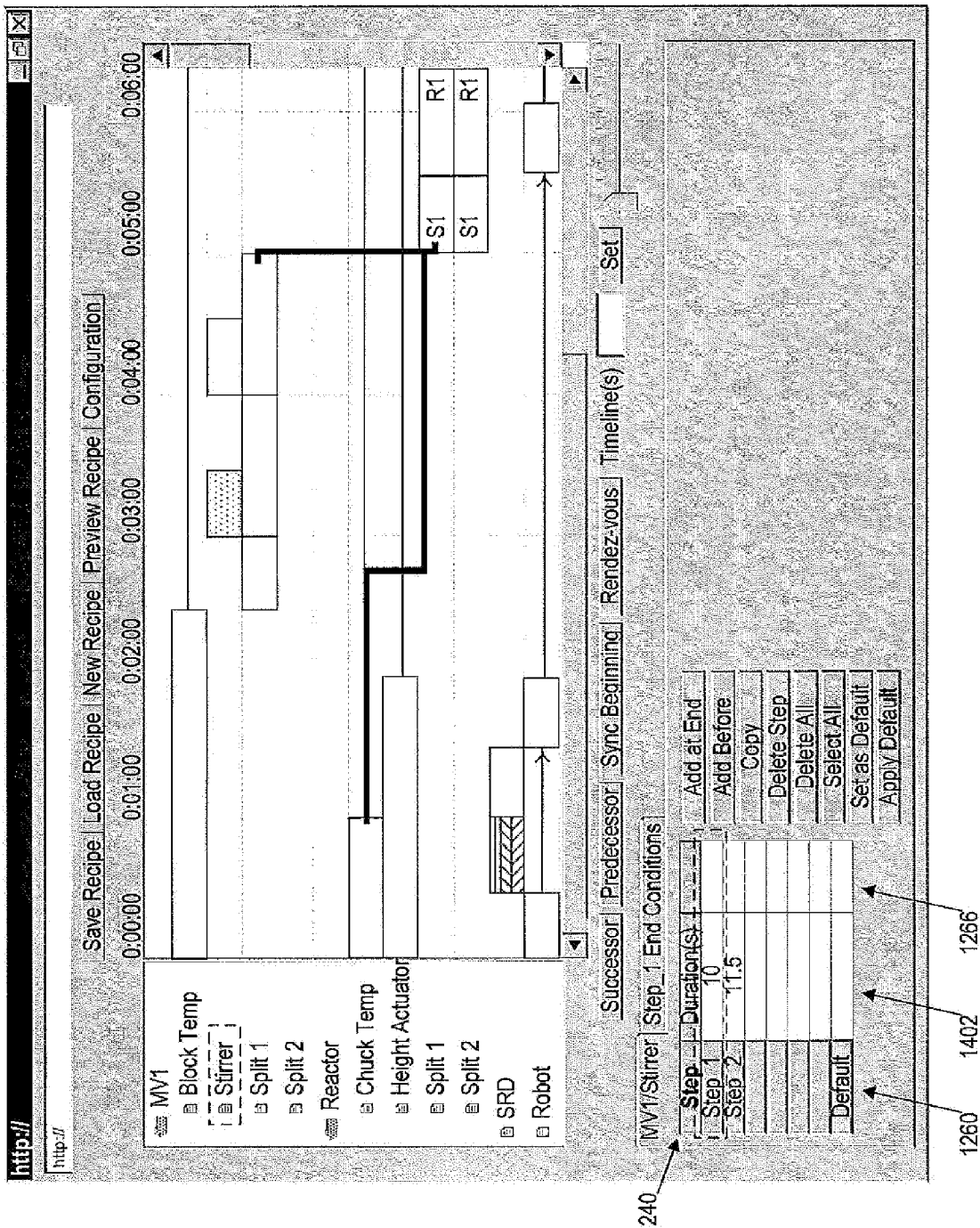

FIG. 14 illustrates the table in page 1240 for setting properties of a stirrer in a mixing vessel subsystem in one embodiment of the invention. The user provides the stirring durations in column 1402.

FIG. 15 illustrates the table in page 1240 for setting properties of a split in a mixing vessel subsystem in one embodiment of the invention. The user provides the pressurized durations in a column 1502, chemicals in a column 1504, flow rates for the chemicals in a column 1506, durations for flow rates in a column 1508, and volumes of the chemicals in a column 1510. Column 1504 for the chemicals may have cells that, once selected, provide a dropdown list of chemicals that the user can select.

In FIG. 15, properties panel 1216 also displays pie charts 1512 illustrating the chemicals applied to the split and their proportions. Pie charts 1512 are labeled with their mixing vessel numbers. The user can select and manipulate the sectors of a pie chart 1512 to change the chemicals and the portions of the chemicals in the split. In response to the changes in pie charts 1512, the table in page 1240 will update in real-time.

Figure 16:
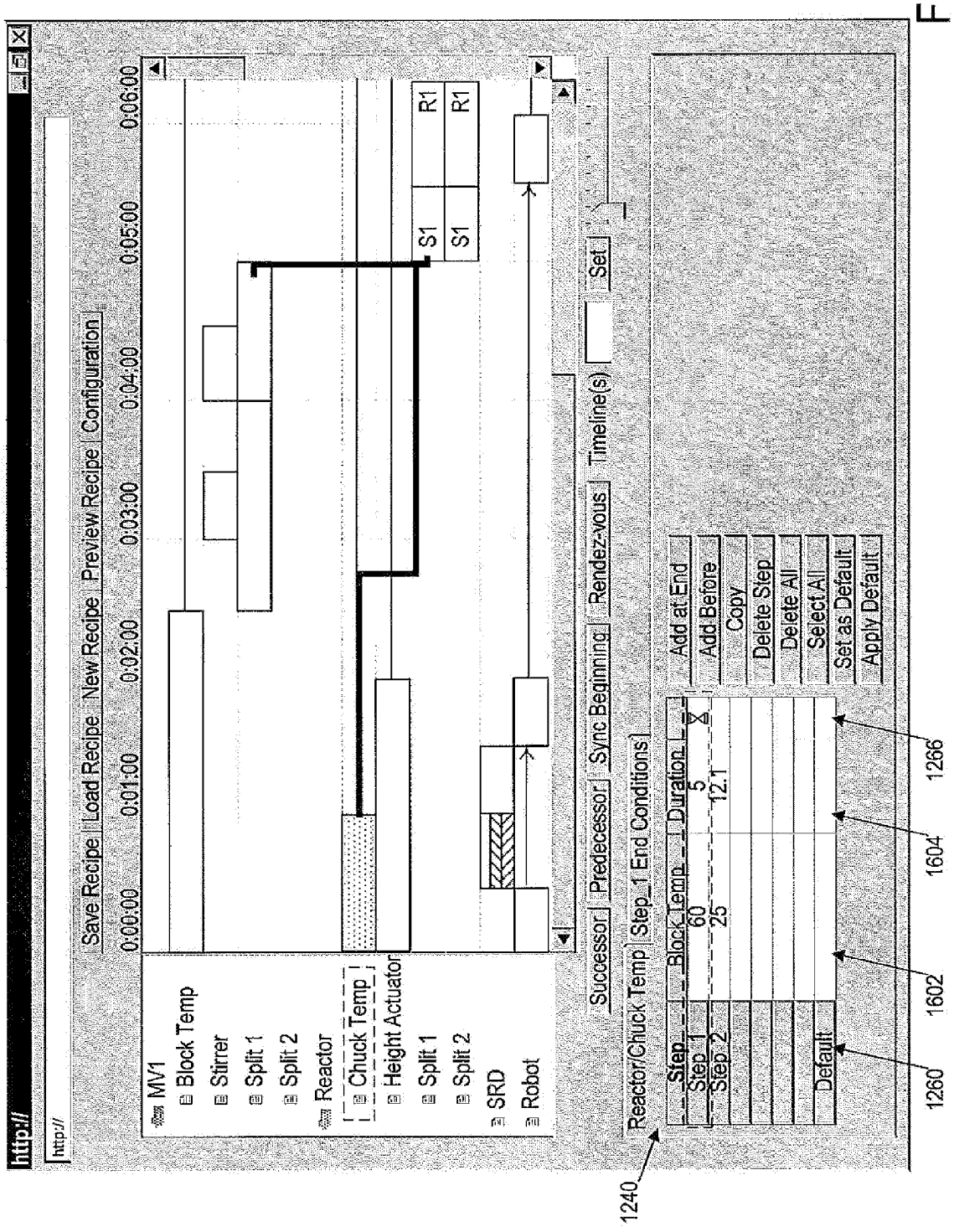

FIG. 16 illustrates the table in page 1240 for setting properties of a chuck in a reactor subsystem in one embodiment of the invention. The user provides chuck temperatures in a column 1602, and the durations of the chuck temperatures in a column 1604.

Figure 17:
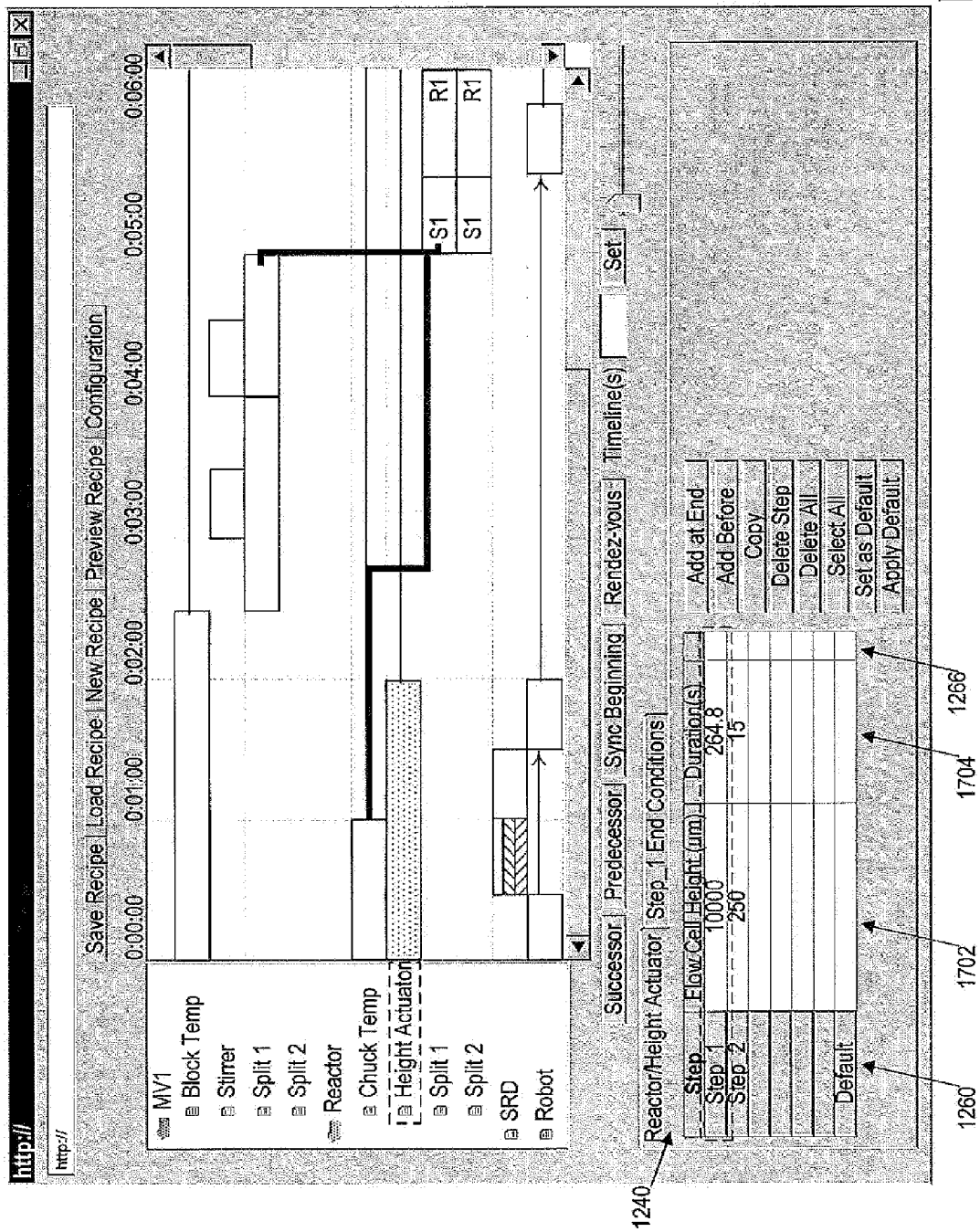

FIG. 17 illustrates the table in page 1240 for setting properties of a height actuator in a reactor subsystem in one embodiment of the invention. The user provides the flow cell heights in a column 1702, and the durations of the flow cell heights in a column 1704.

Figure 18:
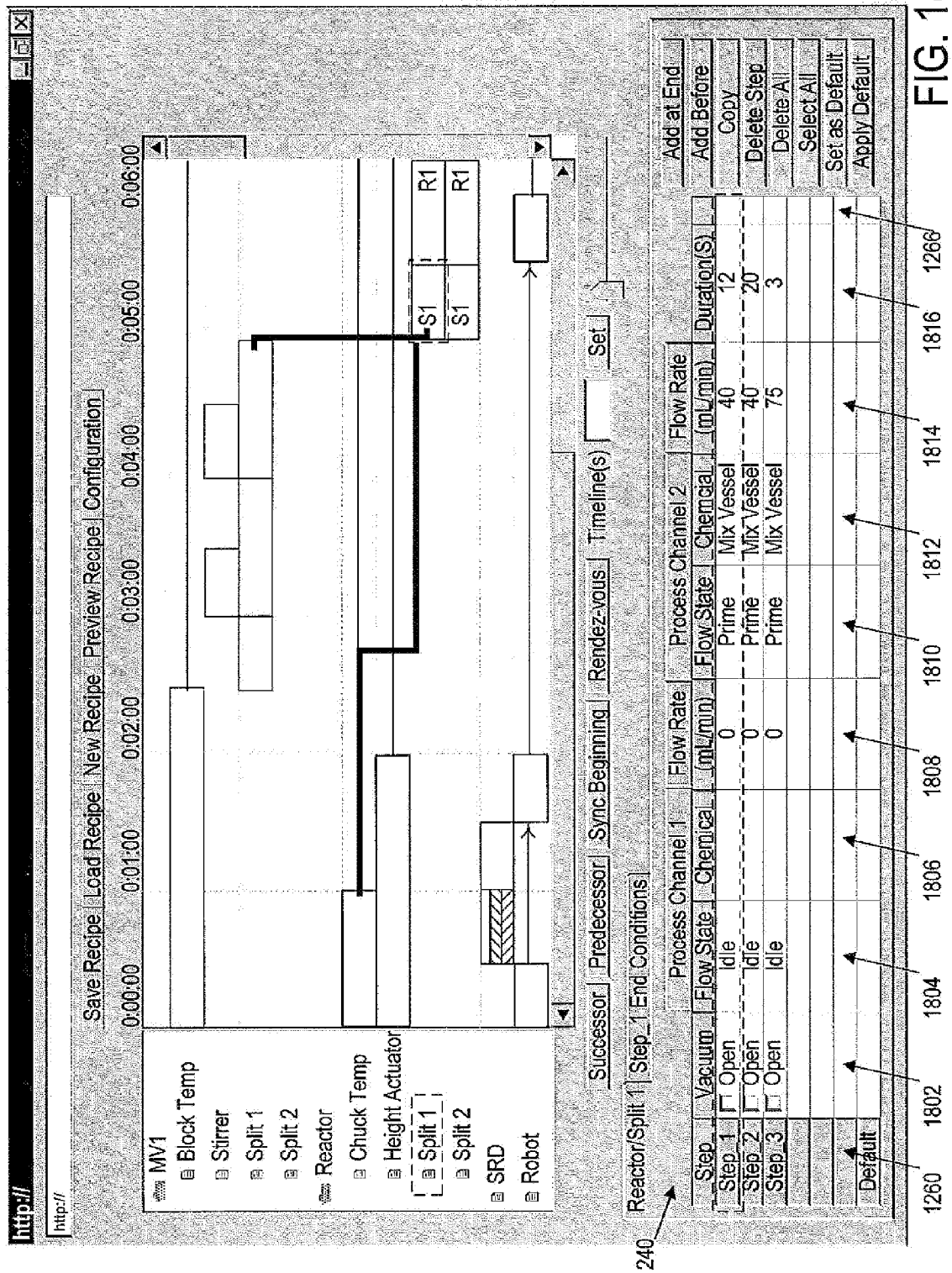

FIG. 18 illustrates the table in page 1240 for setting properties of a split in a reactor subsystem in one embodiment of the invention. For a first process channel, the user provides the flow states (e.g., idle, prime, flow, or bucket) in a column 1804, the source (e.g., mixing vessel or chemical bottle) to the split in a column 1806, and the flow rates in a column 1808. For a second process channel, the user provides the flow states in a column 1810, the source to the split in a column 1812, and the flow rates in a column 1814. For both process channels, the user provides the vacuum states (e.g., open or close) in a column 1802 and the durations of the chemical flow in a column 1816.

Columns 1806 and 1812 for the chemicals may have cells that, once selected, provide a dropdown list of chemical sources that the user can select. When multiple chemicals are applied in a processing operation for the reactor subsystem, the time-bar for the processing operation in Gantt chart 1214 is shown with multiple colors or patterns to visually indicate the chemicals applied in the processing operation. An example of such a time-bar is provided in FIG. 19.

Figure 19:
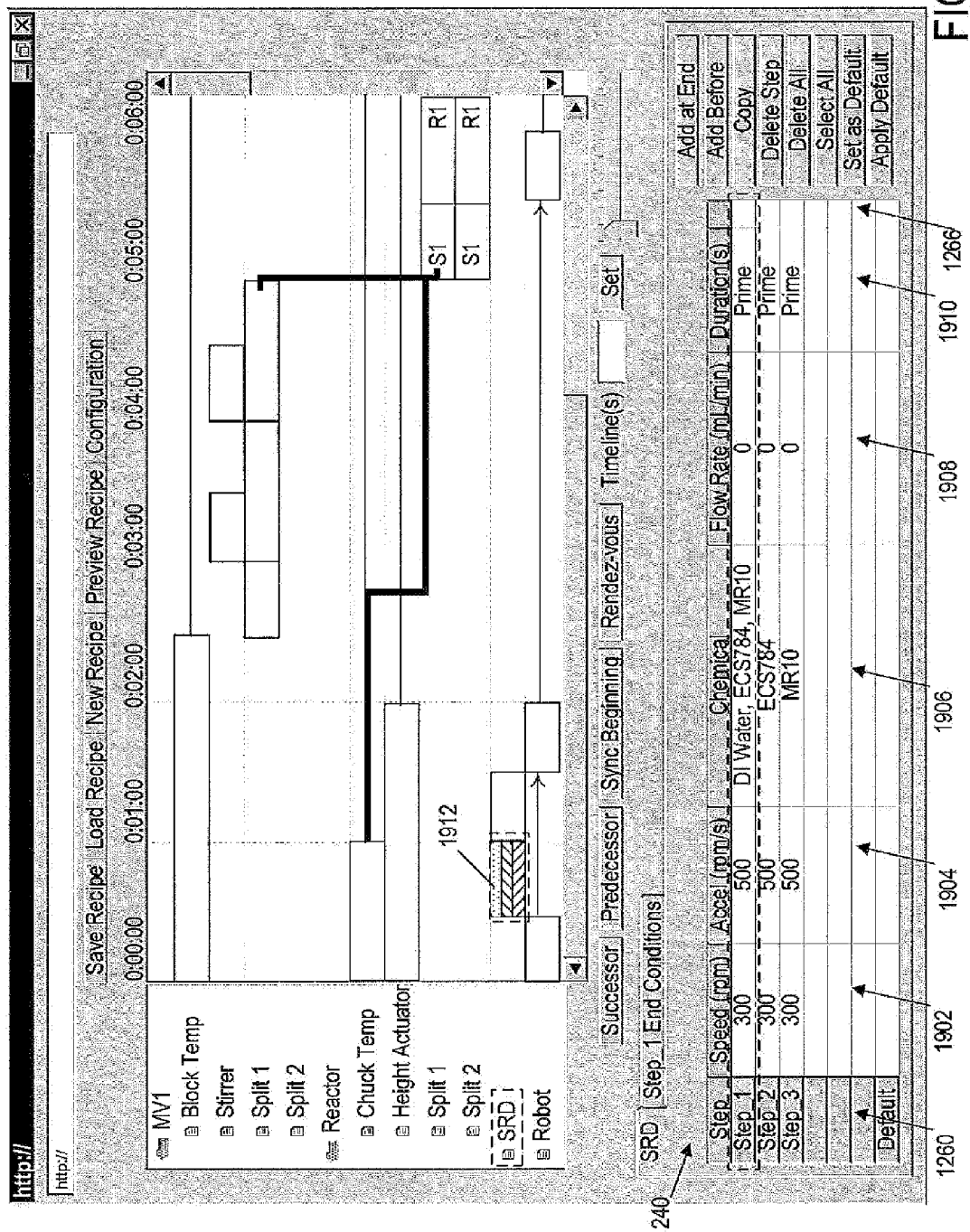

FIG. 19 illustrates the table in page 1240 for setting properties for a SRD subsystem in one embodiment of the invention. The user provides the spin speeds in a column 1902, the spin accelerations in a column 1904, the chemicals to be used in a column 1906, the flow rates of the chemicals in a column 1908, and the durations for the chemical flows in a column 1910. Column 1906 for the chemicals may have cells that, once selected, provide a dropdown list of chemical sources that the user can select. When multiple chemicals are applied in a processing operation for the SRD subsystem, a time-bar for the processing operation in Gantt chart 1214 (e.g., time-bar 1912) is shown with multiple colors or patterns to visually indicate the chemicals applied in the processing operation.

Figure 20:
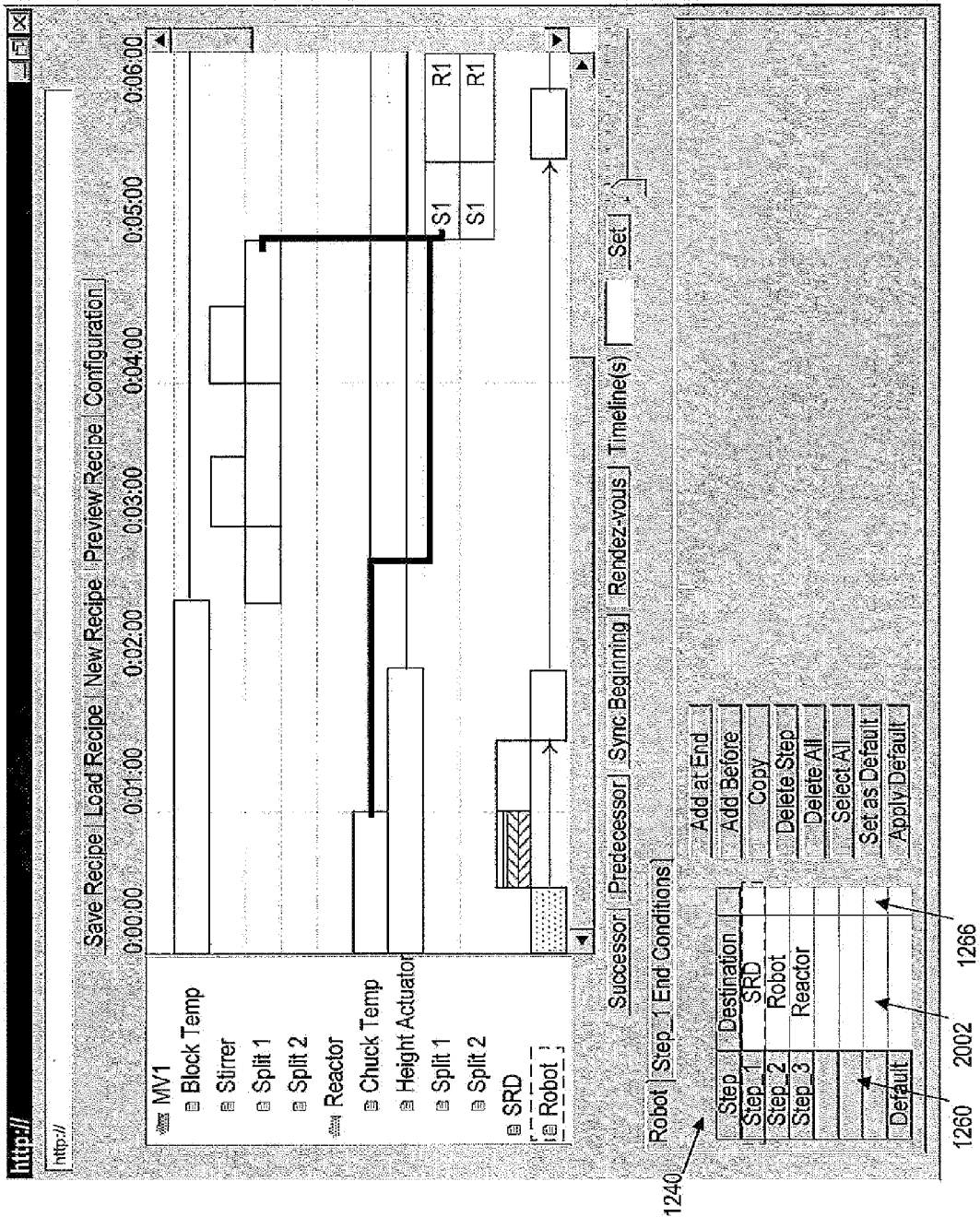

FIG. 20 illustrates the table in page 1240 for setting properties for a factory interface subsystem in one embodiment of the invention. The user provides the destination subsystems in the substrate transfers in a column 2002.

Figure 21:
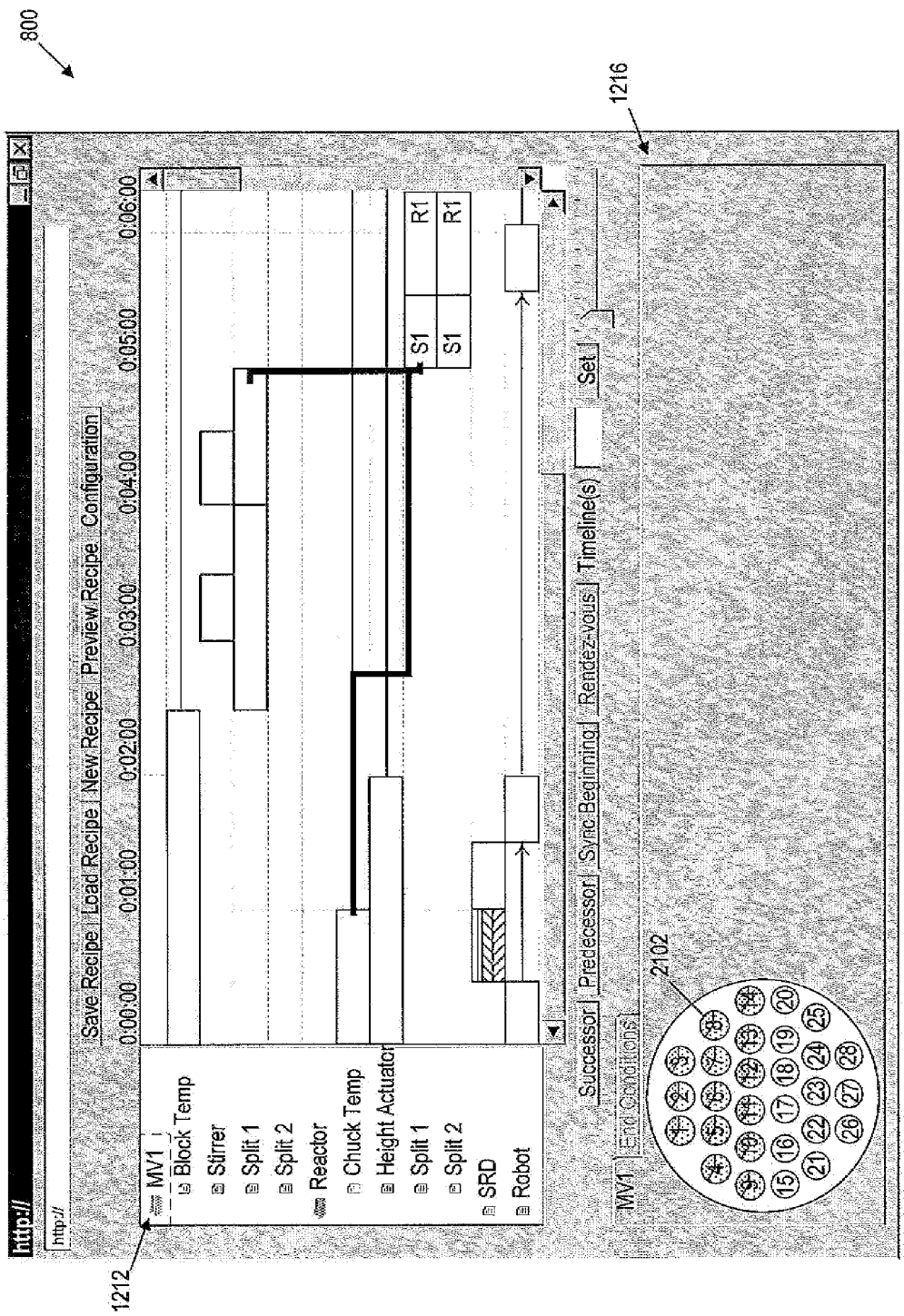

FIG. 21 illustrates main screen 800 after the user selects a mixing vessel subsystem in tree 1212 in one embodiment of the invention. In response, properties panel 1216 visually presents the chemical compositions provided to the mixing vessel subsystem. Specifically, properties panel 1216 displays pie charts 2102 for all of the mixing vessels in the subsystem. For clarity, only one pie chart 2102 is labeled. Pie charts 2102 show the chemicals and their proportions. Pie charts 2102 are labeled with their mixing vessel numbers. Note that the chemicals are identified by the colors or patterns assigned by the user in chemical configuration panel 1000 (FIG. 10).

XML Recipe Format

XML recipe 102 has a nested structure in one embodiment of the invention. A "Recipe" element includes a "Header" element and one "RecipeSteps" element or one "SubRecipes" element. The Header element provides a general description of the Recipe element and declares the subsystem and hardware mapping. The RecipeSteps lists an array of recipe steps that are to be executed sequentially. The SubRecipes element lists an array of Recipe elements that are to be executed concurrently.

Subsystem Tree

Figure 23:
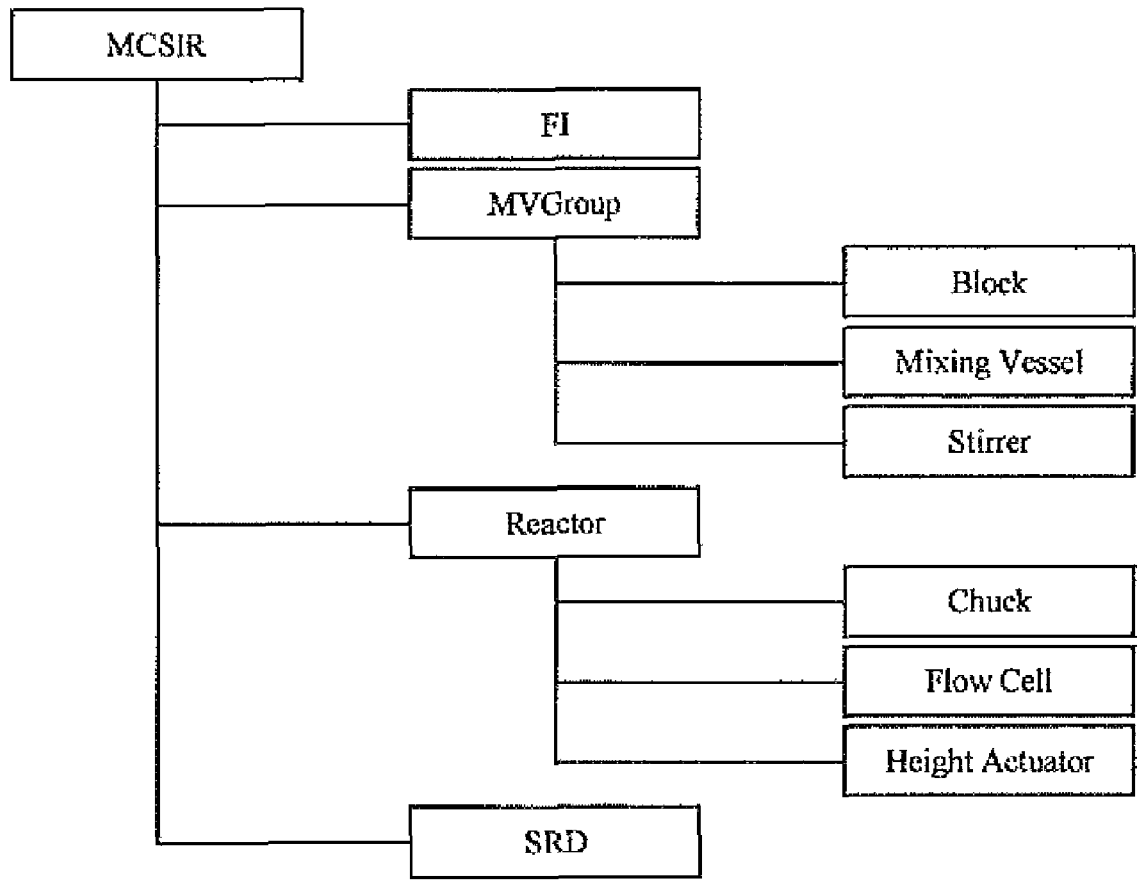
FIG. 23 illustrates a nested structure for the recipes of FIG. 1 in one embodiment of the invention.

The nested structure allows a recipe to carry and execute recipes for its subsystems. FIG. 23 illustrates a subsystem tree that presents the available subsystem and the constraints on the type of subsystems (and the subrecipes) a recipe can support in one embodiment of the invention.

SubRecipes

The Recipe element corresponding to all but the leaf nodes of the subsystem tree will contain a SubRecipes element. Recipe elements defined in the SubRecipes element are executed concurrently.

RecipeSteps

The Recipe element corresponding to leaf nodes of the subsystem tree will contain a RecipeSteps element. The RecipeSteps element includes a sequence of "Step" elements which are to be processed sequentially. Each Step element defines a set of commands to be executed concurrently on the subsystem, as well as conditionals, synchronization, and dependency directives across different subsystems.

Recipe Tool for Other Systems

Although recipe tool 106 has been described with respect to a MCSIR system 104, it may also be used to create recipes for other substrate processing systems such as a chemical vapor deposition (CVD) system, a physical vapor deposition (PVD) system, and an atomic layer deposition (ALD) system. Recipe tool 106 may be adapted to allow the user to synchronize the processing operations of any substrate processing system and visually present that synchronization to the user. In one embodiment, multiple recipe tools 106 are created for each system and the user simply accesses the appropriate recipe tool 106 for her system. Alternatively, recipe tool 106 may be created on-the-fly by a server computer based on the hardware and the functions mapped to a particular system.

Figure 24:
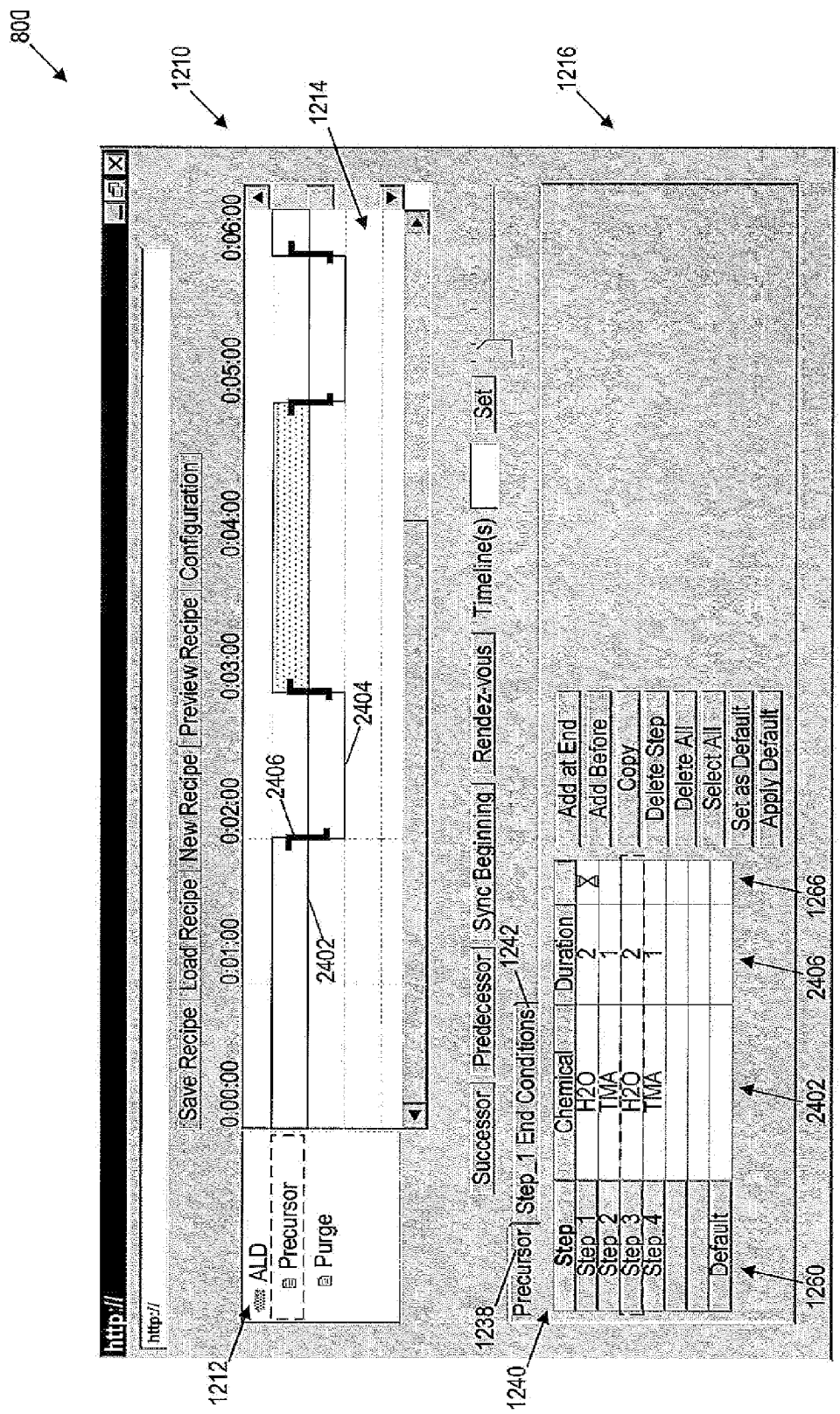
FIG. 24 illustrates a user interface for another recipe tool for another tool in one embodiment of the invention.

FIG. 24 illustrates screen 800 of recipe tool 106 for an ALD system in one embodiment of the invention. For the ALD system, expandable tree 1212 in timeline panel 1210 lists the major ALD subsystems such as the precursor source and the purge chemical source for removing excessive precursor.

As before, Gantt chart 1214 in timeline panel 1210 graphically presents the processing operations as time-bars along the horizontal axis representing time. The time-bars are vertically aligned with the corresponding subsystems in tree 1212. For example, Gantt chart 1214 shows that the first precursor (e.g., $H_2O$) is introduced for two minutes, the first purge chemical (e.g., TMA) for one minute, the second precursor for two minutes, and the second purge chemical for one minute. As before, dependencies and synchronizations can be set for the time-bars in Gantt chart 1214. For example, time-bars 2402 and 2404 have a predecessor/successor relationship indicated by a link 2406 so that the operating process of time-bar 2404 sits idle until the operating process of time-bar 2402 is completed.

As before, properties panel 1216 includes tabs for accessing two pages. The user selects tab 1238 to access page 1240 with a table for setting the properties of the processing operations of a highlighted subsystem in timeline panel 1210. The table has column 1260 listing the processing operation numbers (e.g., step_1, step_2, and so on), and column 1266 indicating if the processing operations have end conditions. The other columns between columns 1260 and 1266 are specific to each subsystem. For the precursor source, the user sets the precursor chemicals in a column 2408, and the duration of applying the precursor chemicals in a column 2410. A similar table is provided for the purge chemical source when it is highlighted.

The user selects a tab 1242 to access a page similar for setting end conditions for a processing operation highlighted in Gantt chart 1214 or page 1240. The end condition page is similar to page 1300 in FIG. 13 described above for system 104.

Various other adaptations and combinations of features of the embodiments disclosed are within the scope of the invention. Numerous embodiments are encompassed by the following claims.

The invention claimed is:

1. A method to graphically create a recipe for processing a substrate, comprising:
    activating a recipe tool running on a client computer;
    the recipe tool displaying non-textual graphical images to a user through a graphical user interface, the non-textual graphical images representing a plurality of processing operations to be performed on the substrate by a substrate processing system;
    the user setting properties of the processing operations by manipulating the non-textual graphical images through the graphical user interface; and
    through the recipe tool, generating a recipe based on the properties of the processing operations set by the user in the manipulating step and synchronizing the plurality of processing operations based on the properties wherein the recipe is operable to be executed on a controller that operates the substrate processing system.

2. The method of claim 1, wherein:
    the properties comprise sequences, timing, and durations of the processing operations; and
    the processing operations comprise combinatorial processes applied to different regions of the substrate.

3. The method of claim 2, wherein the properties comprise chemical composition of the processing operations.

4. The method of claim 3, wherein:
    the processing operations are performed by a system selected from the group consisting of (1) a mixing vessel, (2) a reactor, (3) a spin-rinse-dryer, and (4) a wafer handler; and
    the graphical images represent chemical composition provided to the system.

5. The method of claim 4, wherein the properties comprise at least one of a speed, an acceleration rate, a temperature, a chemical, a flow rate, a flow cell height of the reactor, or a duration.

6. The method of claim 1, wherein a subsequent processing operation depends on a state of a previous processing operation.

7. The method of claim 1, wherein said manipulating the non-textual graphical images comprises setting an end condition for a processing operation to meet before the processing operation proceeds to a subsequent processing operation.

8. The method of claim 1, wherein said manipulating the non-textual graphical images comprises creating a rendezvous point between at least two processing operations so the at least two processing operations proceed to subsequent processing operations at a same time.

9. The method of claim 1, wherein said manipulating the non-textual graphical images comprises at least one of:
    setting a successor link between at least two processing operations;
    setting a predecessor link between at least two processing operations; and
    setting a start point between at least two processing operations to start at a same time.

10. The method of claim 1, wherein said generating the recipe for the system comprises:
    creating an XML document of the recipe; and
    validating the XML document against at least one of (1) an XML schema of the system or (2) hardware configuration of systems to perform the processing operations.

11. The method of claim 1, wherein said displaying, said setting, and said generating to occur in a machine remote from a system to perform the processing operations.

12. A method to graphically create a sequence-based recipe for processing a substrate, comprising:
    activating a recipe tool running on a client computer;
    the recipe tool displaying a non-textual graphical images to a user through a graphical user interface; the non-textual graphical images representing a chemical composition provided to a processing operation to be performed on the substrate by a substrate processing system;
    the user setting the chemical composition by manipulating the non-textual graphical images through the graphical user interface; and through the recipe tool, generating a sequence-based recipe based on the chemical composition set by the user in the manipulating step wherein the sequence-based recipe is operable to be executed on a controller that operates the substrate processing system.

13. The method of claim 12, further comprising:
displaying a list of processing operations;
displaying properties of the processing operations; and
allowing the user to set the properties.

14. The method of claim 13:
wherein:
the properties comprise sequences, timing, and durations of the processing operations, and
the processing operations comprise combinatorial processes applied to different regions of the substrate; and
further comprising and synchronizing the processing operations based on the properties.

15. The method of claim 14, wherein:
the processing operations are performed by an element selected from the group consisting of (1) a group of vessels in a mixing vessel, (2) a group of flow cells in a reactor, (3) a fluid multiplexer and (4) a wafer handler in a spin-rinse-dryer; and
the non-textual graphical image illustrates the chemical composition provided to the element.

16. The method of claim 13, wherein the properties comprise at least one end condition for the processing operation.

17. The method of claim 13, wherein the properties comprise at least one of a speed, an acceleration rate, a temperature, a chemical, a flow rate, or a duration.

18. The method of claim 13, further comprising:
adding and deleting the processing operations of the element from the list; and
setting the properties of the processing operations of the element.

19. The method of claim 12, wherein said generating the recipe for the controller that operates the substrate processing system comprises:
creating an XML document of the recipe; and
validating the XML document against at least one of (1) an XML schema of the system or (2) validating the XML document against hardware configuration of the subsystems.

20. The method of claim 19, after said generating the recipe for the controller that operates the substrate processing system, further comprising:

translating the XML document to subsystem data structures executable by the controller that operates the substrate processing system; and
providing the subsystem data structures to the controller that operates the substrate processing system for executing the recipe.

21. The method of claim 12, wherein said providing, said setting, and said generating to occur in a machine remote from a system to perform the processing operations.

22. The method of claim 12, prior to said providing, said setting, and said generating, further comprising configuring hardware and chemicals of the subsystems in the recipe tool.

23. A method of validating, comprising:
storing a plurality of configuration schemas for a respective plurality of substrate processing tools on a server computer;
receiving a recipe operable to be executed on a controller that operates the substrate processing system through a common interface for one of the substrate processing tools;
validating the recipe will run on the substrate processing tool by comparing it to the stored configuration schema;
wherein receiving the recipe comprises displaying non-textual graphical images to a user through a graphical user interface, the non-textual graphical images representing the plurality of processing operations to be performed on a substrate; the user setting properties of the plurality of processing operations by manipulating the non-textual graphical images through the graphical user interface; and generating the recipe based on the properties of the plurality of processing operations set by the user properties wherein the recipe is operable to be executed on a controller that operates the substrate processing system.

24. The method of claim 23, further comprising executing the recipe using the one of the substrate processing tools to perform a plurality of processing operations.

25. The method of claim 23, wherein validating the recipe comprises comparing the recipe to an eXtensible Markup Language (XML) schema of the one of the substrate processing tools.

26. The method of claim 23, wherein the substrate processing tool is chosen from the group consisting of: a combinatorial processing tool, a wet processing tool, a multi-channel site isolated reactor, a physical vapor deposition (PVD) tool, an atomic layer deposition (ALD) tool, and a chemical vapor deposition (CVD) tool.

* * * * *